United States Patent [19]
Ellison et al.

[11] Patent Number: 5,475,860
[45] Date of Patent: Dec. 12, 1995

[54] INPUT/OUTPUT CONTROL SYSTEM AND METHOD FOR DIRECT MEMORY TRANSFER ACCORDING TO LOCATION ADDRESSES PROVIDED BY THE SOURCE UNIT AND DESTINATION ADDRESSES PROVIDED BY THE DESTINATION UNIT

[75] Inventors: Carl Ellison, Cambridge; Randy Sybel, Blackstone; William D. Snapper, Holliston; Jonathan West, Northborough, all of Mass.

[73] Assignee: Stratus Computer, Inc., Marlboro, Mass.

[21] Appl. No.: 898,157

[22] Filed: Jun. 15, 1992

[51] Int. Cl.$^6$ ............................ G06F 13/00; G06F 13/38
[52] U.S. Cl. ................... 395/846; 364/DIG. 1; 364/242.34; 364/DIG. 2; 364/940; 364/942.79; 395/285
[58] Field of Search ................... 395/275, 200, 395/325, 425

[56] References Cited

U.S. PATENT DOCUMENTS

| | | | |
|---|---|---|---|
| 4,466,098 | 8/1984 | Southard | 371/9 |
| 4,700,292 | 10/1987 | Campanini | 395/200 |
| 4,924,427 | 5/1990 | Savage et al. | 395/425 |
| 5,117,486 | 5/1992 | Clark et al. | 395/250 |
| 5,175,855 | 12/1992 | Putman et al. | 395/700 |
| 5,237,662 | 8/1993 | Green et al. | 395/275 |

FOREIGN PATENT DOCUMENTS

| | | |
|---|---|---|
| 0390567A2 | 3/1990 | European Pat. Off. . |
| 0390567A3 | 3/1990 | European Pat. Off. . |
| 0406759A2 | 1/1991 | European Pat. Off. . |
| 0475005A2 | 7/1991 | European Pat. Off. . |
| 2508200 | 6/1982 | France . |

OTHER PUBLICATIONS

NEC Electronics Inc., product information brochure for the uPD7281 Image Pipelined Processor, pp. 2–169–2–211.
Thorsten von Eicken et al., "Active Messages: a Mechanism for Integrated Communication and Computation", Report No. UCB/CSD 92/#675, Mar. 1992 Computer Science Division–EECS, University of California, Berkeley, Calif. 94720.

*Primary Examiner*—Thomas C. Lee
*Assistant Examiner*—D. Dinh
*Attorney, Agent, or Firm*—Lahive & Cockfield

[57] ABSTRACT

A digital data processing apparatus has two functional units (e.g., a host processing section and a peripheral device) and a controller for transferring information therebetween. The first functional unit generates a send message descriptor block ("MDB") signal specifying one or more addresses in an associated local memory from which data is to be transferred. The second functional unit generates a receive MDB signal specifying one or more locations in its associated local memory to which data is to be transferred. The controller matches send and receive MDB signals, particularly, those specifying the same logical or virtual channel. Once a match is found, the controller transfers data between the respective memory locations of the first and second functional units. A controller as described above transfers data between the host and peripheral processors by directly accessing data in their respective "memory spaces."

24 Claims, 6 Drawing Sheets

INPUT/OUTPUT CONTROL SYSTEM AND METHOD FOR DIRECT MEMORY TRANSFER ACCORDING TO LOCATION ADDRESSES PROVIDED BY THE SOURCE UNIT AND DESTINATION ADDRESSES PROVIDED BY THE DESTINATION UNIT

BACKGROUND

This invention relates to digital data processing and, more particularly, apparatus and methods for transferring information between digital data processing functional units. The invention has applicability, for example, in transferring information between a host mainframe computer and a peripheral device.

Input/output controllers are known for transferring data from a host device to a peripheral device. U.S. Pat. No. 4,926,315, assigned to the assignee hereof, discloses an exemplary computer system in which an input/output controller is connected with peripheral devices via a dual bus structure. The controller applies duplicate strobe signals to the buses and, thereby, defines the timing of data (and control) signal transfers between the units. Each of the peripheral devices monitor the timing signals to initiate processing of information received on the buses.

In accord with related U.S. Pat. No. 4,939,643, the input/output controller initiates data transfer cycles between the peripheral devices by transmitting over the bus structure a cycle-initiating signal. Concurrently, it transfers a peripheral device addressing signal. If a fault occurs during transmission, the peripheral devices generate a WAIT signal, which delays further transmissions by the controller on the buses.

Commonly assigned U.S. patent application Ser. No. 743,992 U.S. Pat. No. 5,379,381 discloses an input/output controller that transfers information with a peripheral device in both direct memory access (DMA) and processor command (PIO) modes. The controller has DMA circuitry and PIO circuitry that work together, during DMA transfers, to interleave data and command transmission without intervention of the local processor.

While the controllers described in the aforementioned patents and patent applications have proven very effective, there remains a need for still better data transfer apparatus that can be used, for example, in an input/output controller.

It is, accordingly, an object of this invention to provide an improved method and apparatus for transferring information between digital data processing functional units. Another object is to provide improved mechanisms and processes for input/output control.

A related object is to provide improved input/output control apparatus and methods that facilitate the rapid transfer of data to functional units, such as peripheral devices, while minimizing the complexity of attendant software and hardware mechanisms.

Still another object of the invention is to provide an inter-functional unit data transfer mechanism with enhanced immunity from timing errors.

Other general and more specific objects of this invention will in part be obvious and will in part appear hereinafter.

SUMMARY OF THE INVENTION

These and other objects are attained by the invention which provides, in one aspect, a digital data processing apparatus having two functional units (e.g., a host processing section and a peripheral device) and a controller for transferring information therebetween. The first functional unit generates a send message descriptor block ("MDB") signal specifying one or more addresses in an associated local memory from which data is to be transferred. The second functional unit generates a receive MDB signal specifying one or more locations in its associated local memory to which data is to be transferred.

The controller matches send and receive MDB signals, particularly, those specifying the same logical or virtual channel. Once a match is found, the controller transfers data between the respective memory locations of the first and second functional units.

A controller as described above transfers data between the host and peripheral processors by directly accessing data in their respective "memory spaces." Thus, according to one aspect of the invention, the host processor and peripheral device are otherwise isolated from one another. That is, they are configured so that neither can directly read or write the other's memory. Those skilled in the art will appreciate that a system so configured is less prone to faults associated with illegal data accesses.

According to further aspects of the invention, the sender and receiver elements generate their respective MDB signals to include a virtual channel number specifying the channel over which a communication is to be effected.

Once a virtual channel is established, the controller's virtual channel circuitry stores each unmatched send or receive MDB signal pending receipt, respectively, of a receive or send MDB signal having a like virtual channel number. According to one aspect of the invention, the virtual channel number is an index into an array of heads of linked lists. Each such list serves as a FIFO of unmatched MDB's for that channel. A linked list head is a structure which contains pointers to the first and last element of the linked list so that blocks may be added at the end and removed from the front with minimum effort.

A controller having virtual channel functionality as described above can handle multiple communication transactions over multiple respective virtual channels, notwithstanding the existence of only a single physical communication pathway (or bus) connecting the controller to each of the functional units.

In related aspects, a controller as described above can include a virtual channel manager for creating, destroying and maintaining virtual channels between functional units. Particularly, each functional unit can generate an MDB signal requesting creation of a new virtual channel for communication with the other functional unit. The virtual channel manager can respond to that request by opening such a channel, allocating a channel number, and notifying the requesting functional unit of the allocated channel number. That virtual channel manager can, itself, be connected with the requesting functional unit via a virtual channel.

A system according to the invention can, further, include a pre-defined DRIVER CONTROL virtual channel for transferring specific types of information between the first and second functional units. That channel can be used by the first functional unit, for example, to signal the second functional unit of a new virtual channel over which a particular communication transaction is to be effected.

In other related aspects, a system according to the invention can incorporate a pre-defined MAINTENANCE & DIAGNOSTIC channel for transferring diagnostic and error messages between the controller and the functional units, as well as a pre-defined DEBUGGER channel for transferring debugging signals between units.

Another aspect of the invention provides a digital data processor of the type described above in which the controller includes an element for returning MDB's to the signalling functional unit, once the requested information transfer is completed. The returned MDB's are, more particularly, transferred to a FIFO buffer in the functional unit that originated the MDB.

In another related aspect of the invention, the send and receive elements of the functional units can specify operations to be executed upon return of their respective MDB's. Thus, for example, the send element of the first functional unit can specify in it's MDB that upon completion for the corresponding transfer certain code be executed, e.g., related to the transfer, and can attach to such MDB data of interest only to that code.

These and other aspects of the invention are evident in the attached drawings and the text which follows.

BRIEF DESCRIPTION OF THE DRAWINGS

A more complete understanding of the invention and of the embodiments described below may be attained by reference to the attached drawings, in which.

DESCRIPTION OF ILLUSTRATED EMBODIMENTS

Figure 1A:
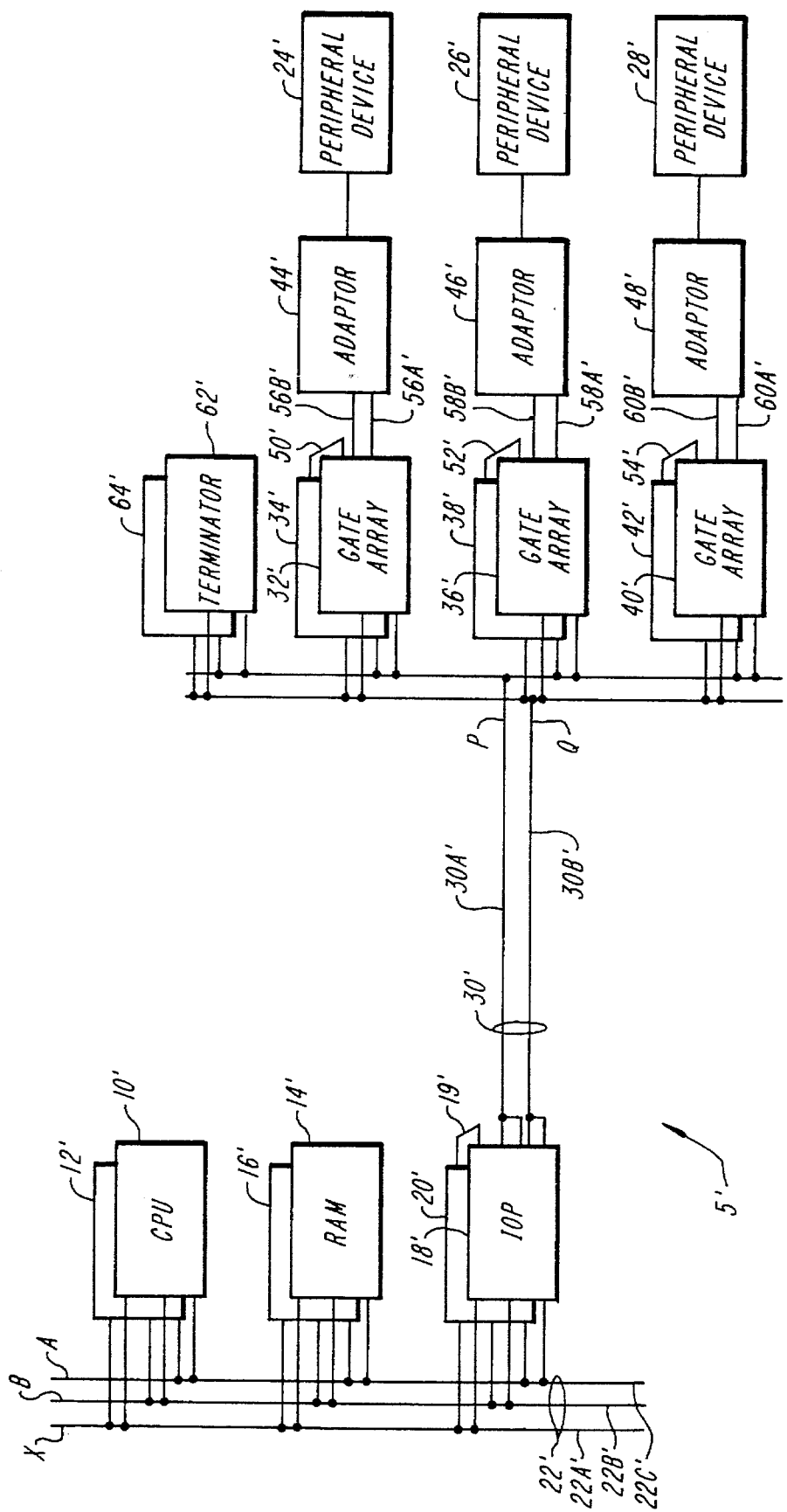
FIG. 1A depicts a preferred digital data processing apparatus used in connection with the practice of the invention.

FIG. 1A depicts a digital data processing system 5' having a fault tolerant peripheral input/output system constructed according to a preferred practice of the invention. The system 5' includes partnered central processing units 10', 12', partnered random access memory units 14', 16', and partnered input/output controllers 18', 20', connected for communications over system bus 22'.

The I/O controllers 18', 20', which are coupled via flash bus 19', control the transfer of information and control signals between the system backplane, represented by system bus 22', and one or more peripheral devices 24', 26', 28'. These peripheral devices can include permanent storage media, e.g., disk and tape drives, communications controllers, network interfaces, and the like.

Peripheral device control and information signal transfers occur over peripheral bus 30', which includes dual input/output buses 30A', 30B'. Signals carried over these buses are routed to the peripheral devices 24', 26', 28' via gate arrays 32', 34', 36', 38', 40', 42' and adaptors 44', 46', 48'.

As shown in the illustration, each peripheral device, e.g., device 24', is associated with a gate array pair, e.g., arrays 32', 34', and an adaptor, e.g., adaptor 44'. The paired gate arrays, e.g., arrays 32', 34', are interconnected by a communications line, as illustrated; e.g., see line 19, page 10.

Moreover, each gate array is connected to its associated adaptor by an adaptor bus; see lines 56A', 56B', 58A', 58B', 60A', 60B'. In turn, the adaptors 44', 46', 48' are coupled to their respective associated peripheral devices 24', 26', 28' via local peripheral lines, as illustrated.

The peripheral bus 30' and, particularly, first and second I/O buses 30A', 30B', are terminated by terminators 62', 64'.

According to a preferred practice, I/O buses 30A' and 30B' serve as redundant signal carriers. That is, the buses 30A', 30B' carry duplicative information signals synchronously and simultaneously. This arrangement facilitates the detection of transmission faults and permits the system to provide continuous, uninterrupted, processing and communication over the non-faulty bus.

According to a preferred practice, each bus 30A', 30b', includes data, control, parity, strobe, and "wait" signal conductors. Physically, the bus 30' can be implemented using two cables of 30 twisted pairs each. Such an implementation permits redundant 8-bit transfers at 4 megahertz using one cable or, alternatively, redundant 16-bit transfers at 4 megahertz using both cables. Information transfers along bus 30' occur at a cycle rate of 250 nanoseconds, thus providing 8-bit transfers at four megabytes per second and 16-bit transfers at eight megabytes per second.

The data, control, parity and wait signal lines of each I/O bus 30A', 30B' are open collector conductors and are driven, for example, by Motorola 26S10 transceivers. Two strobe lines are provided in each bus 30A', 30B'. These paired lines serve as a differential signal carriers driven at the I/O controller 14', 20' and received at terminators 62', 64', The gate array pairs, which may reside on a single board, are inserted in slots of an adaptor chassis (not shown). Each slot is associated with a slot-id which defines the address of the associated peripheral device. In one embodiment, the chassis maintains sixteen such addressable slots, with the far end terminators 62', 64' occupying the final two slots.

A more complete understanding of the digital data processor 5' may be attained by reference to the following patents and patent applications assigned to the assignee hereof, the teachings of which are incorporated herein by reference:

Wolff et al, U.S. Pat. No. 4,486,826 for COMPUTER PERIPHERAL CONTROL APPARATUS;

Williams, U.S. Pat. No. 4,816,990, for METHOD AND APPARATUS FOR FAULT-TOLERANT COMPUTER SYSTEM HAVING EXPANDABLE PROCESSOR;

Reid, U.S. Pat. No. 4,866,604, for DIGITAL DATA PROCESSING APPARATUS WITH PIPELINED MEMORY CYCLES;

Baty, U.S. Pat. No. 4,920,540, for FAULT-TOLERANT DIGITAL TIMING APPARATUS AND METHOD;

Williams, U.S. Pat. No. 5,020,024, for METHOD AND APPARATUS FOR DETECTING SELECTED ABSENCE OF DIGITAL LOGIC SYNCHRONISM;

Long et al, U.S. Pat. No. 4,926,315, for DIGITAL DATA PROCESSOR WITH FAULT TOLERANT PERIPHERAL BUS COMMUNICATIONS;

Reid, U.S. Pat. No. 4,453,215, for CENTRAL PROCESS-

ING APPARATUS;

Dynneson et al, U.S. Pat. No. 4,597,084, for COMPUTER MEMORY APPARATUS;

Samson et al, U.S. Pat. No. 4,654,857, for DIGITAL DATA PROCESSOR WITH HIGH RELIABILITY;

Gardner et al, U.S. Pat. No. 4,750,177, for DIGITAL DATA PROCESSOR WITH FAULT TOLERANT BUS PROTOCOL;

Baty et al, U.S. Pat. No. 4,931,922, for METHOD AND APPARATUS FOR MONITORING PERIPHERAL DEVICE COMMUNICATIONS;

Long et al, U.S. Pat. No. 4,939,643, for FAULT TOLERANT DIGITAL DATA PROCESSOR WITH IMPROVED BUS PROTOCOL;

Long et al, U.S. Pat. No. 4,974,150, for FAULT TOLERANT DIGITAL DATA PROCESSOR WITH IMPROVED INPUT/OUTPUT CONTROLLER;

Long et al, U.S. Pat. No. 4,974,144, for FAULT TOLERANT DIGITAL DATA PROCESSOR WITH IMPROVED PERIPHERAL DEVICE INTERFACE;

Vowles et al, U.S. Pat. No. 5,049,701, for EMI CABINET WITH IMPROVED INTERFERENCE SUPPRESSION;

Baty et al, U.S. patent application Ser. No. 354,139, filed May 19, 1989, for OPTIMIZED INTERCONNECT NETWORKS, abandoned in favor of U.S. patent application Ser. No. 07/884,257, filed May 8, 1992 U.S. Pat. No. 5,243,704;

Yamada et al, U.S. patent application Ser. No. 659,597, filed Feb. 21, 1991, for FAULT-TOLERANT UNIX-TYPE DIGITAL DATA PROCESSING METHOD AND APPARATUS; abandoned.

Stoner, U.S. patent application Ser. No. 694,556, filed May 2, 1991, for HIERARCHICAL MEMORY MANAGEMENT APPARATUS AND METHOD; abandoned.

Cheung, U.S. patent application Ser. No. 696,129, filed May 6, 1991, for FAULT TOLERANT PROCESSING SECTION WITH DYNAMICALLY RECONFIGURABLE VOTING; abandoned.

Bullis, U.S. patent application Ser. No. 723,065, filed Jun. 28, 1991, for DIGITAL DATA PROCESSOR WITH MAINTENANCE AND DIAGNOSTIC SYSTEM; U.S. Pat. No. 5,220,668.

Yamada, U.S. patent application Ser. No. 723,803, filed Jul. 1, 1991, for FAULT-TOLERANT UNIX-TYPE DIGITAL DATA PROCESSING METHOD AND APPARATUS; abandoned.

Lamb, U.S. patent application Ser. No. 743,992, filed Aug. 12, 1991, for I/O CONTROLLER APPARATUS AND METHOD FOR TRANSFERRING DATA BETWEEN A HOST PROCESSOR AND MULTIPLE I/O UNITS; U.S. Pat. No. 5,379,381.

Lamb, U.S. patent application Ser. No. 743,691, filed Aug. 12, 1991, for PROGRAMMABLE INTERRUPT PRIORITY ENCODER METHOD AND APPARATUS; U.S. Pat. No. 5,257,383.

Cheung, U.S. patent application Ser. No. 07/882,474, filed May 13, 1992, for FAULT TOLERANT SECTION WITH DYNAMICALLY RECONFIGURABLE VOTING U.S. Pat. No. 5,423,024.

Data Transfer System

Figure 1B:
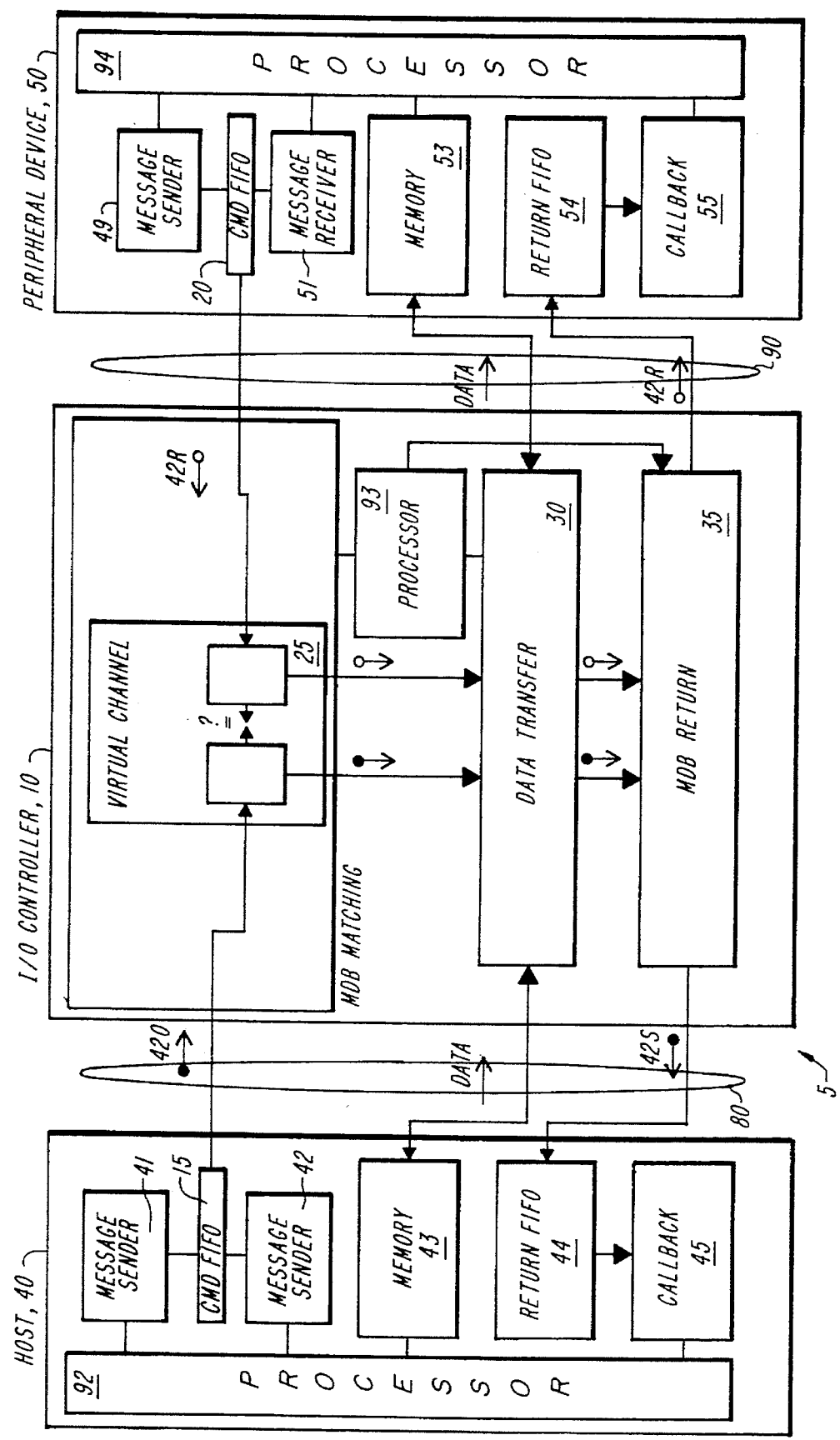
FIG. 1B depicts a preferred data transfer system according to the invention.

FIG. 1B depicts a preferred system for data transfer 5 according to the invention for use in connection with a digital data processing apparatus 5' shown in FIG. 1A. The illustrated system 5 facilitates the transfer of data between the apparatus's functional units, particularly, it transfers information and control signals between the system backplane (system bus 22' of FIG. 1A) and peripheral devices 24', 26' and 28' (of FIG. 1A). It will be appreciated that the data transfer system 5 can also be used to facilitate communication between other functional units, e.g., central processing units.

Based on the teachings herein, illustrated data transfer system 5 can be implemented in special purpose hardware, as well as in software for execution on general- or special-purpose processors. The embodiment described below is implemented in software for operation in connection with the digital data processor 5' of FIG. 1A as described herein.

The illustrated data transfer system 5 includes components designated as input-output (I/O) controller 10 corresponding, for example, to input/output controllers 18', 20' of FIG. 1A; host device 40 corresponding, for example, to central processing units 10', 12' of FIG. 1A; and peripheral device 50 corresponding, for example, to peripheral device 28' of FIG. 1A and interface circuitry associated therewith, e.g., gate arrays 40', 42' and adaptor 48'.

A better understanding of the operation of the aforementioned corresponding components may be attained by reference to Wolff et al, U.S. Pat. No. 4,486,826 for COMPUTER PERIPHERAL CONTROL APPARATUS; Lamb, U.S. Pat. No. 5,379,381 for I/O CONTROLLER APPARATUS AND METHOD FOR TRANSFERRING DATA BETWEEN A HOST PROCESSOR AND MULTIPLE I/O UNITS; and Lamb, U.S. Pat. No. 5,257,393 for PROGRAMMABLE INTERRUPT PRIORITY ENCODER METHOD AND APPARATUS.

Referring to FIG. 1B, illustrated host device 40 includes a command FIFO 15, message sender 41, and a message receiver 42, memory 43, return FIFO 44, and callback unit 45. Illustrated input-output controller 10 includes virtual channel element 25, a data transfer element 30, and a return element 35. Peripheral device 50 includes a command FIFO 20, message sender 49, message receiver 51, memory 53, return FIFO 54, and callback unit 55.

The host processor 40 is coupled to the input/output controller 10 via a bus. This can be of conventional design and, preferably, is of a design and construction disclosed with respect to the backplane bus of Wolff et al, U.S. Pat. No. 4,486,826 for COMPUTER PERIPHERAL CONTROL APPARATUS. Likewise the peripheral device 50 (and associated interface circuitry) can be connected to the input/output controller 10 via a conventional bus. Preferably, that interconnection is effected via a peripheral device bus of the type disclosed in that same patent.

Interfaces 80 and 90 each include three paths for handing communications between the I/O CONTROLLER and the functional unit: (i) a path for communicating MDBs to the I/O CONTROLLER; (ii) a read/write memory bus path (with which the I/O CONTROLLER reads and writes memory in the functional unit, addresses being provided by the I/O CONTROLLER); (iii) and a path for communicating completed MDBs back to the functional unit. Each path operates independently of the other paths. In the illustrated embodiment, when the functional unit is the host, the interface uses a system bus (22') and when the functional unit is a peripheral device, the interface uses the PQ bus (30', 32', 34', 44').

In the illustrated embodiment, a processor 92 within the host device 40 serves as the independent processor for that device's illustrated components, as well as for its interface processes. Likewise, processors 93 and 94 local, respectively, to each of the input-output controller 10 and the peripheral device 50 (or associated interface circuitry) drive those units respective components, as well as their interface processes.

While processors 92, 93 and 94 can be conventional general purpose processing units, illustrated processor 92 is preferably a central processing unit of the type described in Wolff et al, U.S. Pat. No. 4,486,826, and the other aforementioned patents and patent applications assigned to the assignee hereof.

Processors 93 and 94 are preferrably microprocessors of the type disclosed as components of the input/output controllers and peripheral device adaptors, respectively, in Wolff et al, U.S. Pat. No. 4,486,826 for COMPUTER PERIPHERAL CONTROL APPARATUS; Lamb, U.S. Pat. No. 5,379,381 for I/O CONTROLLER APPARATUS AND METHOD FOR TRANSFERRING DATA BETWEEN A HOST PROCESSOR AND MULTIPLE I/O UNITS; and Lamb, U.S. Pat. No. 5,257,383 for PROGRAMMABLE INTERRUPT PRIORITY ENCODER METHOD AND APPARATUS.

Processors 92, 93, 94 have a "peer-to-peer" relationship. Thus, in contrast to a master-slave relationship, neither processor directly controls the operation of another except during I/O controller initialization. Likewise, each processor 92, 93, 94 operates at a speed independent of that of the other processors.

The illustrated data transfer system 5 transfers information between any two functional units. These can be, for example, host processor 40, peripheral device 50, or an additional logical functional unit, e.g., a "connection manager" in the input/output controller 10. These transfers are effected via the exchange of messages at the interfaces 80, 90. The transfers occur over "virtual channels" assigned by the input/output controller 10. The exchanged messages are described by Message Descriptor Blocks (MDB's).

In the illustrated embodiment, a pointer to the descriptor block is used to represent the MDB signal. It will be appreciated that the MDB resides within a segment of memory or a buffer within the device that originates the MDB. Thus, MDB's originated by host processor 40 point, for example, to regions within memory 43. Likewise, MDB's originated by the peripheral device 50 point to regions of memory 53 or buffers local to device 50. Each functional unit 40, 50 initializes and allocates its own MDB's.

In addition to indicating where in the local stores data is to be transferred to or from, an MDB includes further information associated with the data transfer. For example, as discussed below, an MDB designates a software routine— the "callback routine"—to be executed upon completion of the transfer. At the user's discretion, it can also be imbedded within a larger data structure which, in turn, contains data of interest to that callback routine but not of interest to the data transfer mechanism.

Operation

By way of overview, in operation the host device 40 generates and transmits to the command FIFO 15 an MDB 42S. The MDB 42S, which is represented in the drawing by a solid circle and an arrow, includes a description (i.e., address and length) of data to be transferred from memory 43, a virtual channel number over which the MDB is to be sent, and the address of a "callback" routine to be invoked upon completion of the transfer.

The peripheral device 50 likewise generates and transfers to the command FIFO 20 an MDB 42R identifying a buffer to receive incoming data from host device 40. The MDB 42R is represented in the drawing by a hollow circle and an arrow. The MDB 42R also identifies a virtual channel and a callback procedure to be executed upon completion of the transfer.

The message senders 41, 49, message receivers 42, 51 and the command FIFOs 15, 20 are preferably implemented in software. The command FIFO's 15, 20 are preferably portions of memory, but may be hardware FIFO's.

For the purpose of performing a Remote Procedure call, a paired send and receive MDB must be put on command FIFO simultaneously (or "atomically"). The library routine which places MDBs on the command FIFO will accept a list of MDBs to be placed in the FIFO atomically.

In the illustrated embodiment, the command FIFO is implemented as an array which is circularly indexed, with a linked list for overflow. In the event of overflow, a special MDB, referred to as an "overflow bullet", is queued in the array. That special MDB has an "illegal" channel number. When the array has been emptied by the virtual channel element, the overflow bullet is rejected. It returns, marked "rejected", and its callback forces the overflow list to be submitted to the command FIFO. Accordingly, the library routine which submits MDBs to the command FIFO does not block for lack of adequate storage space in the command FIFO.

The devices 40, 50 place their respective MDB's on a command FIFO 15, 20, from which the input/output controller 10 takes them and transfers them to the virtual channel element 25. From there, they are either queued, waiting for a matching MDB on the same channel, or matched with a queued MDB and given as a pair to the data transfer element 30.

The MDB's 42S, 422R are transferred to virtual channel element 25, which matches send and receive MDB's having like virtual channel numbers. Once two similarly designated MDB's are received, the virtual channel element 25 signals the data transfer element to start the data transfer. Particularly, it signals the data transfer element 30 to transfer data from the address range designated in the send DMA to the address range designated in the receive DMA.

The data transfer element can be a conventional direct memory access (DMA) transfer device and, preferably, is a DMA device of the type described in Lamb, U.S. Pat. No. 5,379,381 for I/O CONTROLLER APPARATUS AND METHOD FOR TRANSFERRING DATA BETWEEN A HOST PROCESSOR AND MULTIPLE I/O UNITS.

Upon completion of the data transfer, the MDB's 42S, 42R are returned to their respective functional units. Particularly, MDB 42 is transmitted by the input/output controller 10 to return FIFO 44, while MDB 42R is transmitted to return FIFO 54.

More particularly, once the data transfer is completed, the return element 35 marks matched MDB's 42R, 42S to reflect the status of the data transfer. The MDB's are returned to both the host device 40 and the peripheral device 50 over the corresponding I/O controller interfaces 80, 90.

The return FIFO element 44 located on both the host device 40 and the peripheral device 50 receive the MDB's as they are returned from the I/O controller 10. The return FIFO element is preferably comprised of multiple return FIFO's. In this context a FIFO is then actually the software implemenation of a ring. The return FIFO's preferably include: an interrupt ring, a polled ring, or a custom polled ring.

When the system services one of the return FIFOs (44) (also called "draining the FIFO"), an MDB is removed from that FIFO and either queued for later callback processing or, in the usual case, the callback element (45) is called immediately. That callback routine is free to submit additional I/O, manipulate data structures or merely return the MDB to free storage.

It will be appreciated that, although the example above is for a transfer in a single direction from a host to peripheral device, the illustrated system can transfer in two directions between any two functional units.

Virtual Channels

Virtual channels are created by the input/output controller 10, which allocates and initializes a new channel upon request of host processor 40 or peripheral device 50. This channel creation is performed by the "connection manager" subsection of this input/output processor.

In generating a request, the requestor specifies the direction of the desired channel, e.g., read or write. Presuming the channel can be established, the input/output processor 10 returns to the requestor an integer representing the channel number. In the illustrated embodiment, the input/output controller 10 can generate a channel between any two of the following: the host device 40, the peripheral device 50, and the I/O controller's connection manager.

Preferrably, lower numbered channels are reserved for pre-assigned functions. Thus, channels 0 and 1 are reserved for system level communications; channels 2 and 3, for resident debuggers; channels 4 and 5, for communications to the "connection manager"; and channels 6 and 7, for driver control messages. These pre-defined channels preferably carry single block messages, with the code servicing each channel defining the maximum block size of the message.

In addition to the pre-defined channels, each functional unit can request creation of an arbitrary number of additional uni-directional channels.

Once a virtual channel has been created, the functional units 40, 50 can request that the channel be flushed, closed or disconnected. The connection manager, located in the GIZA engine backplane, implements these requests. The process of flushing a channel returns any MDB's that have been posted to the requesting device, and retrieves any MDB's that have been stored in the storage elements 15, 20 and not yet processed. Any MDB's already paired up and transferring complete their transfer and are returned.

A functional unit at either side of a channel can flush its side and its side only of that channel. This might occur as a result of an I/O abort command by a system user. It may also occur as a prelude to the closing of that channel. Once a flush request is received and processed by the I/O controller (10), the channel is marked "flushing", any MDB pairs being transferred are allowed to finish and any MDB's from the flushing side which are awaiting matches are marked "flushed" and returned to their functional unit. The fundamental data-driven programming rule is observed also during flush operations: all MDB's for any given channel are returned in the order in which they were submitted.

A functional unit can also request that a channel be closed. Upon requesting this state, the functional unit indicates that it will no longer submit MDB's to the channel. When one functional unit declares its side of a channel closed, the input/output processor (10) will no longer accept MDB's for that channel from that functional unit. When both functional units declare the channel closed, the channel is returned to the free pool of channels for later re-use. In a preferred embodiment, the calling device requests closure only of a previously flushed channel.

The disconnect MDB can be submitted from either the host device 40 or the peripheral device 50, but, when issued, forces the channel, identified by its integer channel number, to flush and close both sides of the channel at the same time.

In a preferred sequence, a channel is flushed prior to closing or disconnecting the channel. However, use of a channel can also be temporarily interrupted, via a flush call, in order to retrieve posted MDB's as part of, for example, an I/O abort request. Once the MDB's are retrieved, the system driver can resume using the still open channels by accessing the resume library routine. The channel number generated by a previous connect routine call identifies the channel located in the virtual channel element 25 that will resume carrying and storing submitted MDB's.

Figure 2:
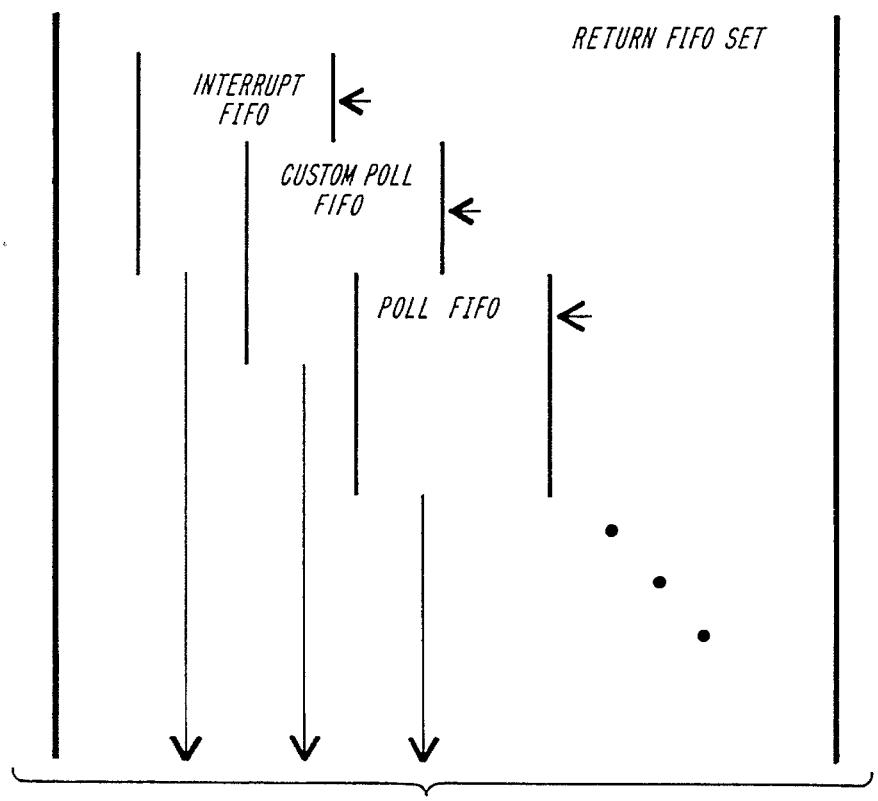
FIG. 2 depicts a preferred return FIFO in a system according to the invention.

FIG. 2 depicts a preferred return FIFO element containing multiple return FIFO's or rings.

There are various options for return FIFO's contained in both the host device 40 and the peripheral device 50. That is why each device 40, 50 is allowed to have multiple return FIFO's contained in the return FIFO elements 44, 54. A return FIFO can interrupt its functional unit or not since an interrupt ring is designed to signal an interrupt when an MDB is placed on the ring (provided the ring was previously empty). If it does not interrupt, then it must be polled by code within the functional unit. Polling, usually more efficient in terms of processor cycles is sometimes lower in latency as well, depending on the overhead required to service an interrupt.

A preferred embodiment of the invention will use a custom polled ring or FIFO and a polled ring or FIFO. A custom polled ring, which is not normally polled, may be in special circumstances. For example, custom polled rings might be used only for test programs or by the CPU PROM while in a debugger state while the system is halted. A polled ring polls the system frequently, e.g., in a main loop or in scheduler code.

A more complete understanding of the illustrated embodiment may be attained by reference to the following sections, in which the preferred illustrated data transfer system 5 of the input/output controller (or input/output processor, IOP) 10 is referred to by the term "Giza".

General Information

The input-output controller (GIZA) is a message passing facility that makes the input/output controller 18', 20' architecture more efficient when transferring blocks of data from one address space to another (e.g., when moving data from an I/O adapter (IOA) 48' to host 40 main memory 43).

This illustrated system transfers data between the memories of two functional units. It differs from conventional transfer apparatus in that it controls that transfer by matching two "half-requests" and forming a whole transfer request from those halves.

Each half-request is generated by the functional unit whose memory will be read or written during the transfer. The half-requests, accordingly, specify locations in the respective memory, along with control parameters such as channel number, direction of transfer (Read or Write), and RETURN FIFO number (described further below).

Between the controller and each functional unit are two or more FIFO's, each for transferring addresses of Message Descriptor Blocks (MDB's) representing the aforementioned half-requests. These FIFO's transfer MDB addresses, rather than the MDB's themselves. For sake of brevity, in the text which follows, the storage in FIFO's of MDB pointers may be referred to as the storage of the MDB's themselves in those FIFO's.

Of the FIFO's between a controller and each of its functional units, one is called the COMMAND FIFO and carries MDB's from the functional unit to the controller; the others are called RETURN FIFO's and carry MDB's from the controller back to the functional unit.

Controller Operation

In view of the teachings herein, it will be appreciated that the illustrated input/output controller (and corresponding functionality within the other functional units) can be implemented in hardware or software. The controller itself, moreover, can be implemented as a single unit or as a collection of distributed units coupled via a communications media.

Regardless, the controller executes three Stages:
1. Matching
2. Data Transfer
3. Result-Reporting Hardware implementations can have separate processors for these sections, running autonomously and communicating from one to the next by queuing work to do. Software implementations may use a single processor and communicate from one section to the next by transfer of program control.

Stage 1: Matching

One at a time, the controller removes an MDB from a non-empty COMMAND FIFO connected to it. From that MDB, a channel number is extracted which is then used as an index into an array of memory called the match table. Each entry in the match table is a small data structure containing the following:

Preferred Software Implementation
    pointer to the head of a list of MDB's
    pointer to the tail of a list of MDB's
    status information, including:
        functional unit designator for the writing side
        functional unit designator for the reading side
        state on the writing side (closed, open, flushing)
        state on the reading side (closed, open, flushing)
        indicator of which side has MDB's in the list Preferred Hardware Implementation
    pointer to the head of a list of MDB's for the writing side
    pointer to the tail of a list of MDB's for the writing side
    pointer to the head of a list of MDB's for the reading side
    pointer to the tail of a list of MDB's for the reading side
    index of another match table entry to have a match to be processed by the data transfer unit
    status information, including:
        functional unit designator for the writing side
        functional unit designator for the reading side
        state on the writing side (closed, open, flushing)
        state on the reading side (closed, open, flushing)

Preferred Multipiece, Distributed Hardware Implementation
    pointer to the head of a list of MDB's for the current side
    pointer to the tail of a list of MDB's for the current side
    index of another match table entry to have a match to be processed by the data transfer unit
    status information, including:
        functional unit designator for the current side
        communication line designator for the other side
        state on the current side (closed, open, flushing)
        state on the other side (closed, open)
        direction of transfer ((write from/read into) the current side)
    (if writing from the current side:)
        count of the number of MDB's known to be queued on the other side
    (if reading into the current side:)
        count of the number of MDB's needing to be reported to the other side If the channel number for the MDB is illegal (out of range of the defined match table), the MDB is marked as in error and sent immediately to Stage 3, Result Reporting. Otherwise, the entry for this MDB is examined. The direction of transfer is extracted from the MDB and the appropriate field of the match table entry is examined to determine if that channel is open for that direction of transfer.

If the channel is closed, the MDB is in error and is sent immediately to Stage 3. If the channel is flushing, the MDB is marked "flushed" and sent immediately to Stage 2 where it does no data transfer but waits behind any transfers actually in progress or pending from that channel. (The controller promises to preserve order of MDB's for any extant channel throughout the process— so that they are returned through the selected RETURN FIFO in the same order in which they arrived on the COMMAND FIFO.)

If the MDB passes these tests, the match table entry is examined to determine if there are already MDB's from this side queued on the appropriate linked list. If so, this MDB is added to the end of that list (using standard single-threaded linked list methods) and this Stage's processing of this MDB has finished.

If there are no MDB's already queued for this side, the match table is examined to determine if there are MDB's queued for the other side. If so, this MDB and the first MDB queued on the other side constitute a match. The two of them are queued for Stage 2, Data Transfer, and this Stage's processing of this MDB has finished.

If there are no MDB's queued for either side, this MDB is queued for this side and this Stage's processing of this MDB has finished.

If the implementation is distributed (multiple-piece), then whenever a receive MDB is queued on a channel, information about it (at least its channel number) is recorded for a message to the appropriate other piece of the controller—for it to use in updating its match table. Such messages can be sent immediately or, in the preferred implementation, batched until a timer counts out or the update message fills and must be sent. Whenever a send MDB is matched with a non-zero count of receive MDB's on the other side, it is queued for controlling a transmission to the other side. That transmission is of the message described by the MDB, prefixed with its channel number. Whenever a message is received from the other side, the prefixed channel number is received first and the first receive MDB is taken from the match table entry indicated by that channel number and used to control where to store the incoming message.

Stage 2: Data Transfer

Excepting flushed MDB's—which merely wait in line behind real transfers—the data transfer stage of the controller receives matched pairs of MDB's in an ordered list or FIFO. When it comes time to do another transfer, the pair at the head of the list is compared to determine if there is at least as much memory indicated in the reading MDB as there is in the writing MDB. If not, there is an overflow error and the MDB's are marked in error and the transfer is not performed. (In the distributed case, this unusual error is best handled by initiating the transfer and discarding overflow bits at the receive end rather than waiting for a negotiation to determine if there is room but both implementations are possible.) If there is room to receive all that will be written, the transfer is performed. At the completion of Stage 2, whether normal or error, the pair of MDB's (or single flushed MDB) is passed along to Stage 3, Result Reporting.

Stage 3: Result Reporting

On completion of a data transfer, any errors which were detected before or during the transfer are noted in both MDB's. If there were no errors, that too is noted and, in addition, at least the receiving MDB has the length of data actually written recorded in it (alongside the field(s) specifying length(s) of buffer(s) in which to receive the message).

(In the illustrated embodiment, both MDB's receive the actual length moved.)

MDB's, having received this status information, are written back to the RETURN FIFO indicated in the MDB. If there is no such RETURN FIFO, FIFO number 0 for that functional unit is used. That FIFO must always exist. If the selected RETURN FIFO is full, a linked list of MDB's associated with that FIFO is used to hold the overflow MDB's and MDB's are periodically moved from that list into the FIFO as space becomes available.

Functional Unit Operation

Within each functional unit, two operations must be performed in order to achieve data transfer:

1. giving MDB's to the COMMAND FIFO
2. draining MDB's from the RETURN FIFO('s)

Giving MDB's To The Command FIFO

In the illustrated embodiment, in each functional unit, assumed to be a programmed digital data processor, there is a library routine called "submit" which is given a list of MDB's. These MDB's are to be submitted to their COMMAND FIFO "atomically"—that is, MDB's in the list must appear in the COMMAND FIFO in order, with no other MDB's (from some other submit operation) interspersed in the middle of the list.

Those skilled in the art will note that a remote procedure call can be implemented by a pair of MDB's —one writing to a channel and the other reading from another channel, where those two channels are used respectively by a remote process for reading requests and for writing replies. It will also be appreciated that if two RPC requests (W1,R1) and (W2,R2) are submitted non-atomically, the ordering (W1, W2,R2,R1) can occur which will result in the reply to command 1 going to requester number 2 and vice versa.

Different functional units have different characteristics. If necessary, "submit" may have to disable interrupt levels and/or set a lock in order to preserve atomicity of COMMAND FIFO submissions.

A COMMAND FIFO can carry lists of MDB's (as would be best for the hardware implementation) or individual MDB's (as was found to be best for the software implementation). If the former, atomicity is guaranteed by the controller. If the latter, it must be guaranteed by the submit routine in the functional unit.

There is a linked list associated with each COMMAND FIFO called the Overflow List. If the submit routine discovers that the COMMAND FIFO is almost full (currently, when it has room for one more MDB), or if the Overflow List is non-empty, the submitted MDB(s) is(are) placed on the end of the Overflow List. When the Overflow List is started, a special MDB (called the Overflow Tracer) is placed on the COMMAND FIFO instead of the submitted MDB(s). The Overflow Tracer is an MDB whose channel number is illegal (and therefore will be immediately rejected by the controller and returned as in error). It has a callback routine (described below) which takes the entire Overflow List and submits it, atomically. The COMMAND FIFO together with the Overflow List provides a queuing mechanism for MDB's which can not fill. Therefore, the submit routine will never have to block waiting for room.

Draining MDB's from the Return FIFO(S)

Different RETURN FIFO's are drained at different places in the code of the functional unit. That is why there are multiple RETURN FIFO's allowed for in the design. There is one for each place that one needs to be drained. For example, there can be a FIFO drained:

eat interrupt level in a polling loop (every X seconds with a different FIFO for each value of X desired)

polled from a debugger which has suspended normal operation of the rest of the system polled from some process In a preferred practice, a demand for fewer than six such FIFO's has been found. Many functional units have been found to require only one FIFO.

In each case, the RETURN FIFO is drained by repeatedly removing the pointer to one MDB from the head of the FIFO, taking from that MDB the address of a routine called the "callback" and calling that routine, giving the pointer to the MDB as the only argument. This achieves direct interrupt vectoring on a per-transfer (as opposed to per-controller or per-device) basis.

Limits

At no place in this process is there blocking while waiting for storage within the controller or its FIFO's. Thus there is no limit on the number of MDB's which can be queued for any one channel or the whole set of channels served by the controller—except for a limit imposed by the need to allocate disjoint sections of memory for different MDB's and the messages they describe.

There is a limit on the number of channels. This is limited by the size of the match table. Match table entries are small enough that the number of channels can easily exceed number needed in most cases encountered by the illustrated embodiment. If it becomes necessary to have more channels there is match table, it is possible to multiplex multiple sub-channels over a single virtual channel using standard techniques.

Scope of Giza

Figure 3:
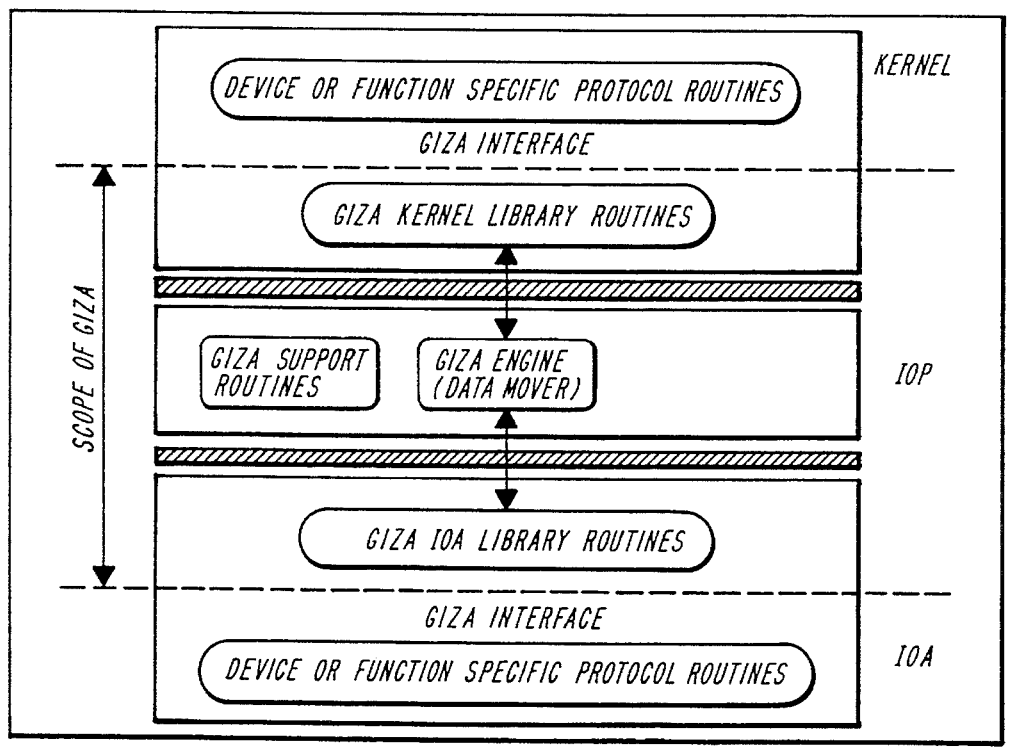
FIG. 3 is an architectural overview of a preferred data transfer system according to the invention.

As shown in FIG. 3, Giza includes four main components:

Giza Engine (Data Mover)

Giza Support Routines

Giza Library Routines

Giza Engine

The illustrated Giza engine (data mover), which can be implemented in hardware, is implemented in software as part of IOP firmware. It operates alongside existing IOP functions.

Giza Support Routines

The Giza support routines are distinct from the Giza engine in that they play no part in the normal movement of data. They primarily provide connection management; that is, opening and closing Giza connections between the kernel and the IOA (or I/O controller).

Giza Kernel Library Routines

The Kernel Library is the programming interface that enables an operating system kernel programmer to do the following:

set up Giza connections to transfer data over these connections to break these connections.

This interface is intended for use in connection with a Unix-like operating system, e.g., the operating system described in copending commonly assigned U.S. Pat. No. 5,220,668, filed Jun. 28, 1991, as well as in the VOS™ operating system commercially available from the assignee hereof.

Giza IOA Library Routines

The IOA Library is the programming interface that allows an IOA programmer to do the following:

set up Giza connections to transfer data over these connections to break these connections.

Design of Giza

Giza uses the concepts of data-driven programming. Data driven programming involves collections of autonomous processes with each collection of processes governed by its own functional unit (as used herein, a functional unit may be, for example, an independent processor). The functional units, in general, have a peer-to-peer relationship; neither is master to the other's slave. Each functional unit operates at a speed independent of the other functional unit. If one pauses or speeds up, it does not affect the correctness of operation of the system.

Specific rules govern data-driven programming to ensure deterministic results, that is, that a given input will produce the same output regardless of timing. Thus, Giza was designed using these rules so that it is invulnerable to timing bugs. Specifically, the rules include:

1. An MDB, once submitted, cannot be retracted and should not be modified.

2. All MDB's over any single channel are processed in the same order that they were submitted, through both data transfer and callback processing. This includes abnormal cases such as flush, close and disconnect.

3. There is no time-out for an MDB (since that would amount to retraction of a submitted MDB).

It is noted, however, that drivers using Giza are not required to follow data-driven programming rules. Rather, they are permitted to follow those rules and to know that the machinery provided by the system preserves the rules.

The GIZA engine also provides an array of advantages over other data transfer systems. A few of these advantages are listed below.

Advantages of Giza

The following describes several strengths of the Giza mechanism:

functional unit peer-to-peer equality

Giza gives the same view of communication to the IOA processor and the host system. The interface is essentially the same on both sides. (Note, however, that the host system 40 usually takes responsibility for connection management.)

Address space protection

Giza transfers data from one address space to another. In this process, only Giza and its DMA know both addresses. Neither of the communicating partners knows the addresses in the other partner's space. Thus, neither partner can accidentally access the other's space.

Timing invulnerability

Since Giza was designed according to the rules governing data-driven programming, it is invulnerable to timing bugs. There are no race conditions for Giza operation and no chance for changes in functional unit speed to cause problems. Each functional unit works independently of the other.

Direct interrupt vectoring

Giza provides the developer with the ability to specify the interrupt handling procedure to be used for each message sent or received. This interrupt routine is called directly, without having to traverse a decision tree.

Ground-level interrupt batching.

Giza provides the developer the option of having interrupts come in batches at ground level; for example, when the scheduler runs or when the Streams service routine runs. This eliminates the overhead of interrupt code which merely queues some work to be done at ground level.

OVERVIEW of GIZA MESSAGES

The procedure for sending and receiving Giza messages requires one functional unit to prepare data to be sent to the other side for processing and also the other side to prepare to receive and process the data as necessary. The data is passed, as part of a Giza message, between the two functional units over numbered Giza channels. Once the data is handed off, the sending process gives up complete control of the sent data and continues doing something else—e.g., preparing and transmitting another piece of data.

Message Path

FIG. 1B shows the Giza message path. The illustrated embodiment uses software rings to transmit and receive messages. MDB's are submitted to Giza by way of a command (or to_Giza) FIFO 15, 20 and received back on a response (or from_Giza) ring. Each side can have a number of response rings, but only one command ring. The side that is transmitting data sends an MDB containing a pointer to the data to its command ring while the receiving side sends an MDB specifying a pointer to a buffer to its command ring.

Message communications takes place over numbered channels. These channel numbers apply to an individual Giza engine only. When an MDB for a message or buffer is submitted to Giza, it includes the channel number for which it is intended. The library call that submits the MDB to Giza (giza_submit( )) is given the number of the backplane slot containing the particular Giza engine. Low numbered channels (presently, channels 0 through 7) on each Giza engine are reserved for pre-assigned functions. Also, each I/O adapter card associated with a particular Giza engine has reserved pre-defined channels (presently, channels 8 through 119).

General Description of the Message Delivery Process

A message is delivered from one functional unit to another in five distinct steps.

1. Functional unit A submits to Giza an MDB describing the outgoing message and specifying a channel which has already been opened.

2. Functional unit B submits to Giza an MDB describing a buffer for receiving a message and specifying the same channel as functional unit A.

Note: The first two steps can happen in either order. Also, multiple entries can be made on either side, whereby they are queued until the partner MDB shows up.

3. Once both functional units have supplied MDB's, Giza performs the data transfer from A to B and notes the completion status in each of the MDBs.

4. Functional unit A receives its MDB back from Giza, with acknowledgment that the message has been transferred successfully over the specified channel.

5. Functional unit B receives its MDB back from Giza, with acknowledgment that the message successfully arrived over the specified channel.

Conceptual Basis of Giza Message Delivery

An I/O driver which utilizes GIZA can envision I/O devices as remote subroutines or pipelines.

Figure 4:
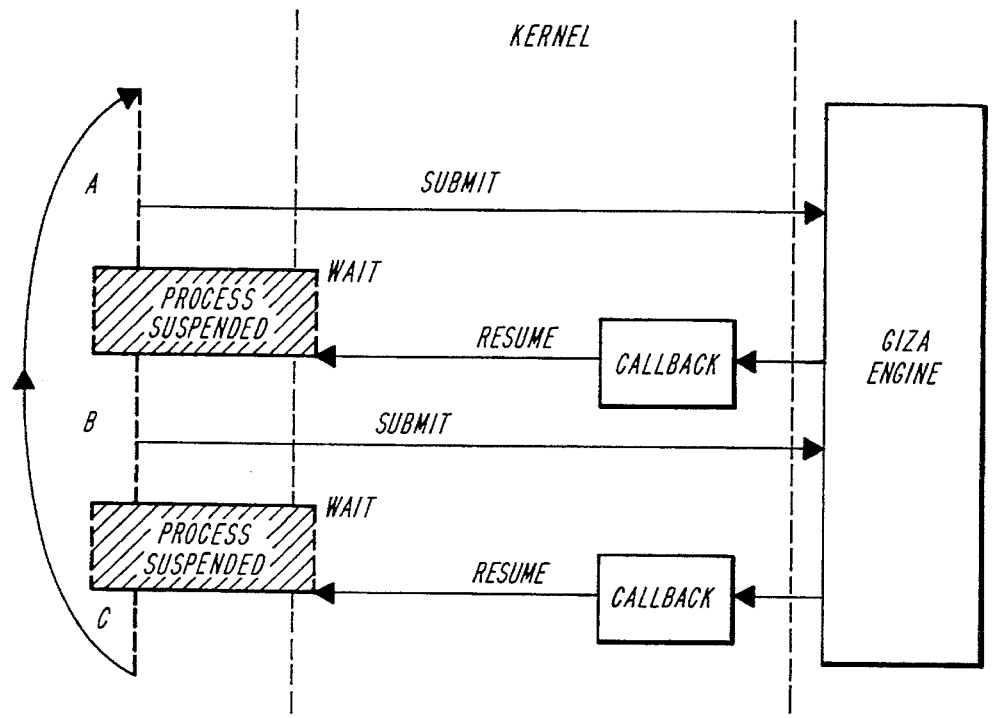
FIGS. 4, 5 and 6 depict remote subroutine models for use in construction of a remote input/output driver utilizing a preferred data transfer system according to the invention.
Figure 5:
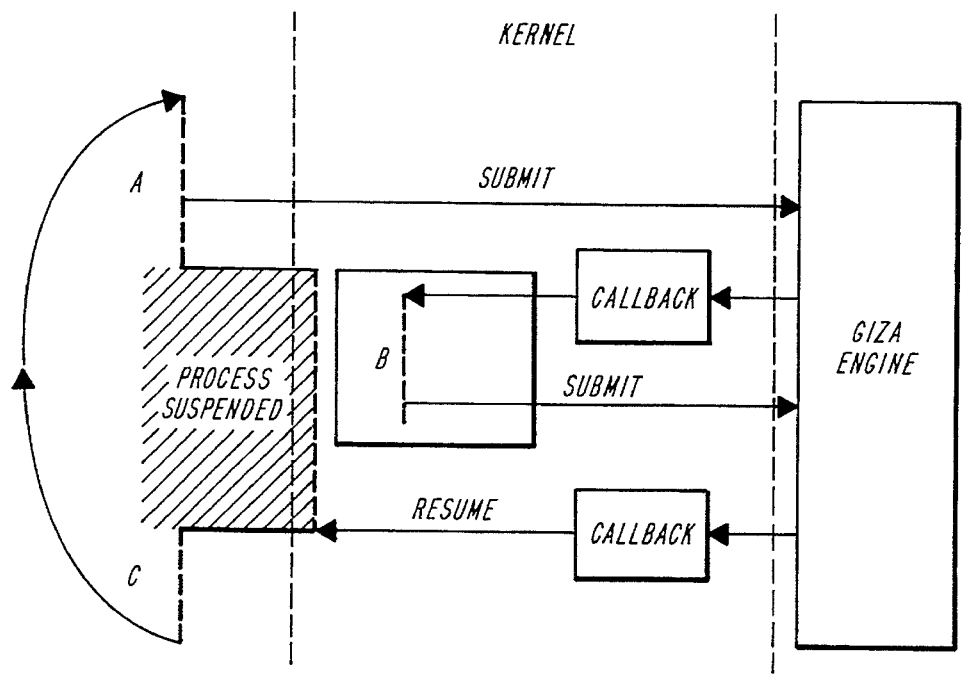
Figure 6:
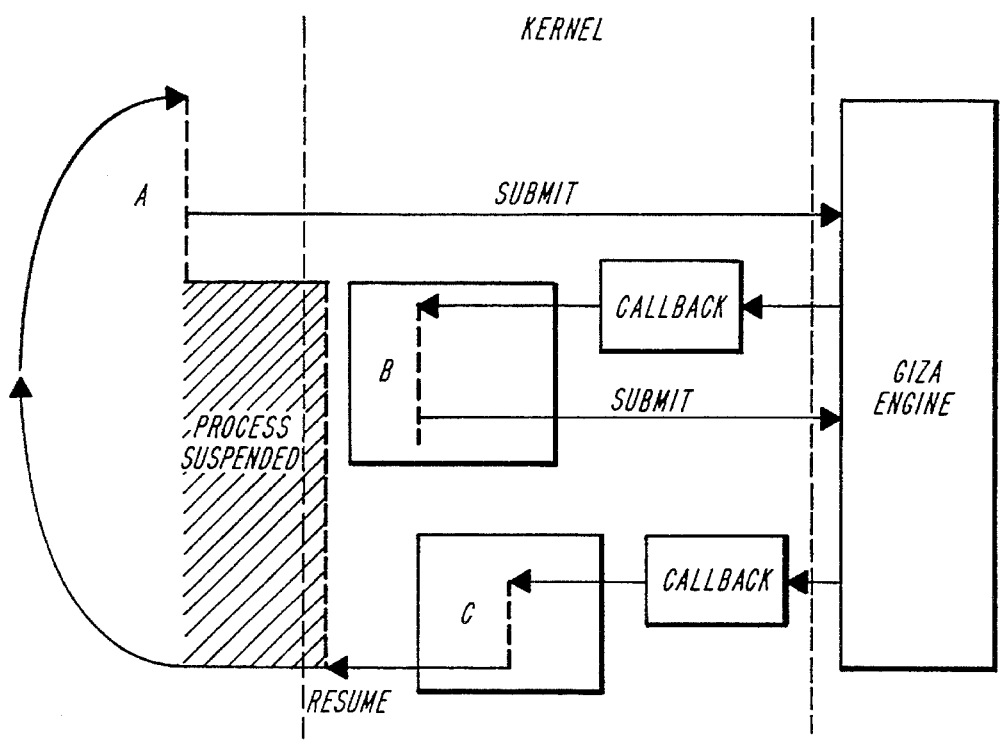

FIGS. 4, 5 and 6 show remote subroutine models, where an I/O driver sends a message to its partner, gets a reply and continues processing (as if after a return from a subroutine).

Figure 7:
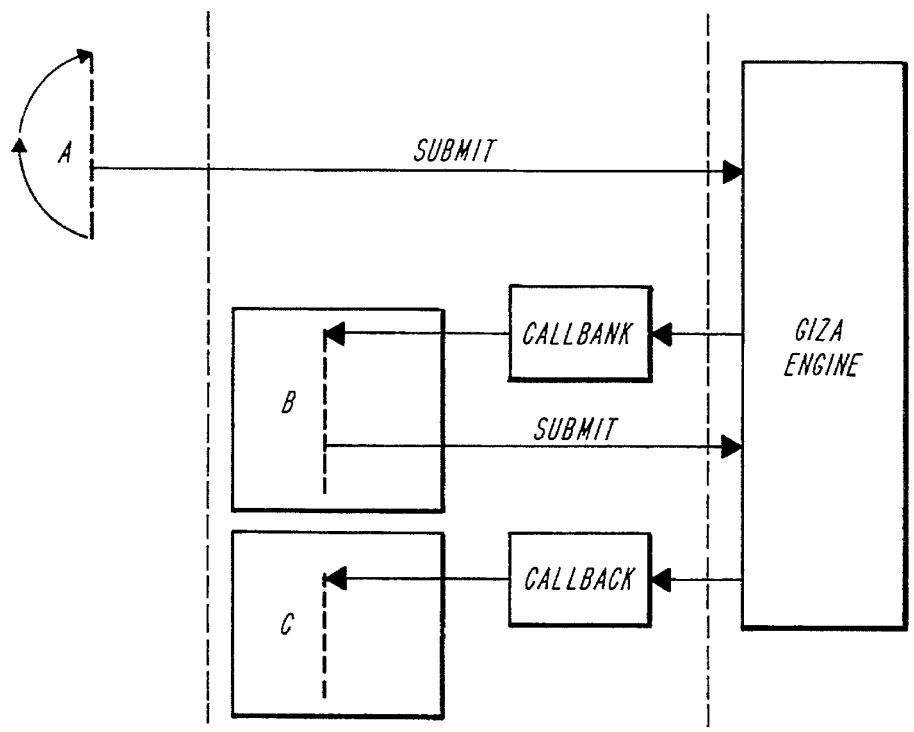
FIG. 7 depicts a pipeline model for use in construction of a remote input/output driver utilizing a preferred data transfer system according to the invention.
Figure 8:
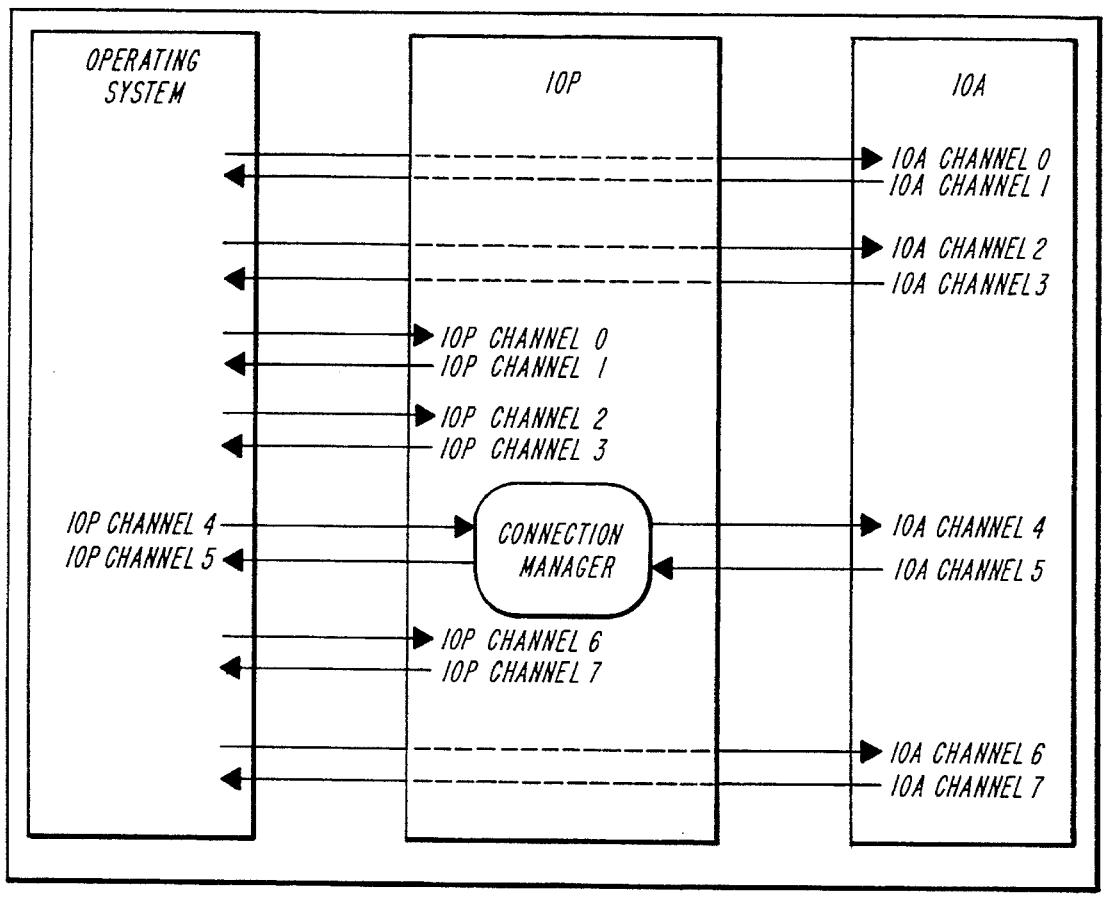
FIG. 8 illustrates pre-defined channels employed in a preferred data transfer system according to the invention.

FIG. 7 shows a model that permits pipelining. In a pipeline model, the piece of I/O driver code transmitting messages, for example, submits a message to the engine; however, it then does not need to wait for a reply but can go on to do something else (e.g., submit another message to the engine).

Giza is based on the pipeline model; that is, the Giza engine can be seen as one block in a pipeline. It takes MDBs and either holds them (until there are matching MDBs from the other functional unit) or pairs them with matching MDBs and does transfers. Eventually, the Giza engine returns the MDBs to another piece of driver code that is probably unrelated to the first piece of driver code (e.g., the receiving code might simply return MDBs and buffers to a free pool for that driver). Similarly, on the receiving side, the code that gives MDBs to Giza only handles freed buffers. The code that receives filled buffers can treat new messages as such, without worrying about the buffers that were provided to carry them.

Message Descriptor Blocks represent the signals transferred between the host device, peripheral device and GIZA. Their construction is significant and is as follows:

Giza Message Descriptor Blocks

Giza employs Message Descriptor Blocks (MDBs), which are structures that provide the following information to Giza:

on the sending side, a description of the message; on the receiving side, a description of the buffer that will receive the message control information, e.g., Giza channel number status information, e.g., number of bytes actually transferred interrupt vectoring, in the form of a callback routine address.

An MDB is not merely a set of parameters to Giza. It is a block of memory that becomes the property of the Giza engine, once it is submitted to Giza, and remains its property until it is returned (upon completion or channel flush). When submitting more than one MDB to Giza, the Giza engine runs a thread through the MDBs to queue them in a linked list for each virtual channel.

Although a basic MDB has one block and one segment, developers can structure the data portion of the message as desired—for example, to have multiple blocks each of a different length, with each block composed of multiple segments (for scatter-gather DMA operation).

In contrast to other methods, the multi-block message is a viable way of handling certain problems. For example, assume that the host wants to write a 4096-byte page of data to disk. To move the data from the kernel to the IOA, the host submits and MDB with two single-segment blocks—one 16-byte block for the write command, and one 4096-byte block for the data.

The IOA can't know how many bytes are coming, so it submits an MDB describing a buffer with two blocks—one 128-byte block for the command, and a second block with two 2048-byte segments to hold arriving data.

Since the command portion coming from the host is only a 16-byte block of data, only 16-bytes are put in the 128-byte buffer on the IOA side; the rest remains unused, and the 4096 bytes of data fill the two 2048 byte segments.

In the illustrated embodiment, an MDB consists of a header, a block header, segment headers, field descriptors, and data buffers. The following provide a more detailed description of these components.

Composition of MDBs

In the illustrated embodiment, an MDB consists of a header (sys mdb header or ioa mdb_header), one or more block headers (block_header), and one or more segment headers (sys_block_segment or ioa_block_segment) for each block.

MDB Header Fields

In the illustrated embodiment, MDB headers differ between the host and IOA side of GIZA partly because physical pointers are of different sizes in those two functional units.

The following shows the host-side MDB header (using the C programming language format to describe data structures).

```
typedef struct LONGMAP sys_mdb_header
{
    void                       (*callback) (struct
                                sys_mdb_header *mdbp);
    struct sys_mdb_header      *salvage_list_fp;
    struct sys_mdb_header      *salvage_list_bp;
    struct sys_mdb_header      *virt_next_link;
    sys_phys_ptr               phys_next_link;
    long                       MDB_length; /* For Tarl's
                                FDDI */
    channel_number             channel_ID;
    struct sys_mdb_header      *return_ring_item; /* this
                                MDB */
    giza_msg_status_template   message_status;
    giza_control_template      control;
    unsigned char              return_ring_index; /* choice
                                of ring */
    unsigned char              number_of_blocks;
} sys_mdb_header;
```

The following shows the IOA-side MDB header.

```
typedef PACKED struct SHORTMAP ioa_mdb_header
{
    void                       (*callback) (struct
                                ioa_mdb_header *mdbp);
    ioa_phys_ptr               phys_next_link;
    struct ioa_mdb_header      *return_ring_item; /* this
                                MDB */
    channel_number             channel_ID;
    giza_msg_status_template   message_status;
    giza_control_template      control;
    unsigned char              return_ring_index; /* choice of
                                ring */
    unsigned char              number_of_blocks;
} ioa_mdb_header;
```

When submitting an MDB to Giza, the caller provides the following header information.

callback virt_next_link (if submitting more than one MDB)

MDB_length channel_ID control return_ring_index number_of_blocks

The Giza engine fills in the message_status field.

Field Descriptions callback

The address of a routine that gets called when the MDB returns after data has transferred.

virt_next_link

If submitting more than one MDB, the virtual address of the next MDB, otherwise NULL.

MDB_length

On the host side, the length in bytes of the entire MDB. This includes the MDB header, as well as all block and segment headers.

channel_ID

The Giza channel number to which the MDB is sent.

control

The following are values for the MDB header control field.

define RECEIVE 0x00/* Receive MDB */ define SEND 0x01/* Send MDB */ return_ring_index

The index of the response ring on which this MDB returns.

number_of_blocks

The number of block headers.

message_status

The Giza engine fills in this field. The possible values are shown below.

```
/* Values for message status */
    #define GOOD_DMA                0;
    #define FLUSHED                 1; /* MDB flushed */
    #define BLOCK_ERROR             2; /* Number of blocks
                                       wrong */
    #define INVALID_CHANNEL         3;
    #define DEAD_IOA                4;
    #define DEAD_IOP                5;
    #define PER_BLOCK_ERROR         6; /*See
                                       block_header's status*/
    #define                         -1;
    ILLEGAL_INTERNAL_STATE
```

Block Header Fields

Block headers have no physical pointers, and are therefore the same on the host and IOA sides. The following shows the block header structure.

```
typedef struct LONGMAP
{
    giza_blk_status_template    status;
    giza_block_control_template block_control;
    unsigned char               pad_byte;
    unsigned char               number_segments;
    long                        block_checksum;
} block_header;
```

The caller provides the following block header information for an MDB.

status block_control number_segments

The engine accumulates the block_checksum, if used.

Field Descriptions block_header.status

The values for the block status field are shown below.

```
typedef unsigned char            giza_blk_status_template;
#define giza_blk_status_template_error 0x80
#define giza_blk_status_template_verify_error 0x40
#define giza_blk_status_template_parity_error 0x20
#define giza_blk_status_template_checksum_error 0x10
#define giza_blk_status_template_overrun 0x08
#define giza_blk_status_template_crossed_page_boundary 0x04
``` block_header.block_control

The values for the block control field are shown below.

```
#define giza_block_control_template_cache_consistent 0x80
#define giza_block_control_template_append_checksum 0x40
#define giza_block_control_template_check_checksum 0x20
#define giza_block_control_template_gen_checksum 0x10
```

Note: The source (write-side) defines the checksum method, of which there are three:

append_checksum check_checksum gen_checksum

With the append_checksum, the receiver expects to get data with an appended checksum from the sender. If not, checksum errors are generated.

For the check_checksum option, the source provides a checksum at the end of a block of data for both sides. While the two MDBs are still in the engine, the engine makes sure that both checksums match. If not, checksum errors are generated.

The gen_checksum method is not used at this time.

block_header.number_segments

The number of segment headers.

block_header.block_checksum

If the checksum is used, this must be zero.

Segment Header Fields

The segment descriptors are different on the host side and the IOA side because the physical address lengths are different.

The following shows the host side segment descriptor.

```
typedef struct LONGMAP
{
    sys_phys_ptr          address;
    unsigned short        seg_length;
    unsigned short        length_moved;
    long                  pad_long;
} sys_block_segment;
```

The following shows the IOA side segment descriptor.

```
typedef PACKED struct SHORTMAP
{
    ioa_phys_ptr          address;
    unsigned short        seg_length;
    unsigned short        length_moved;
} ioa_block_segment;
```

The caller provides the following information for segment headers.

sys_block_segment.address sys_block_segment.seg_length

The Giza engine fills in the sys_block_segment.length_moved (or ioa_block_segment.length_moved).

Field Descriptions sys_block_segment.address

The physical address of the data buffer.

sys_block_segment.seg_length

The length in bytes of data.

sys_block_segment.length_moved

The length in bytes of the data actually moved.

The following represent sample MDB's as developed by a potential sytem user.

Sample MDBs

The following shows sample MDB's.

```
typedef struct /* Host-side MDB of 1 block, 1 segment */
{
    sys_mdb_header        hdr;
    block_header          blk;
    sys_block_segmen      seg;
} sys_mdb_11;
typedef struct /* IOA-side MDB of 1 block, 2 segments */
{
    ioa_mdb_header        hdr;
    block_header          blk;
```

| | ioa_block_segmen | seg[2]; |
|---|---|---|
| } | ioa_mdb_12; | |

In the illustrated embodiment, code in a functional unit submits MDB's to GIZA. This means that ownership of (permission to modify) the MDB and its described message is by convention given from the functional unit to the GIZA device. GIZA uses these MDB's to control transfer of messages and upon completion of such a transfer, gives ownership of the MDB back to the functional unit which submitted it. That functional unit then retrieves such MDB's from GIZA. The following represent the library routines and data structures associated with these submit and retrieve operations.

Library Routines for Submitting and Retrieving MDBs

The subsections below briefly describe the Giza interface for the following:

submitting MDBs to Giza retrieving MDBs from Giza

Library Routine for Submitting MDBs to Giza

Giza has one library routine, giza_submit, which enables submitting a single MDB or a list of MDBs to the Giza engine by way of the to_giza ring.

When multiple functional units could make this call at the same time, the to_giza ring is first locked. Then, if the submitting functional unit has address mapping, the physical address for each MDB is computed and the to_giza ring receives the entire unbroken list of MDBs. Giza processes the MDBs in order, from list head (mdbp) to tail when virt_next link is NULL. This list is temporary since the Giza engine may write over the virtual next pointers used.

Library Routines and Macros for Retrieving MDBs From Giza

The Giza library has a number of routines for checking response rings and retrieving MDBs:

giza_drain_response_ring giza_drain_reject_list giza_prep_scan giza_drain_array giza_drain_test.

The giza_drain_response_ring library routine empties the indicated response ring of MDBs, calling the callback entry for each of them.

Giza_drain_reject_list is similar to the giza_drain_response_ring, except that it retrieves MDBs that the giza_submit rejects because they have an improper format.

Giza_prep_scan library routine is called periodically to update an array of pointers to active response rings. That array can then be scanned using the giza_drain_array macro, to drain any MDBs, or the giza_drain_test macro to test whether the response ring has any pending MDBs.

Library Routine Calling Sequences

The following subsections describe the library routines for Giza message delivery. The routines are listed in alphabetical order.

short giza_prep_scan(long rnum, sys_giza_command_ring_control **rrcpp);

Description

The giza_prep_scan( ) library routine is called periodically to update an array of pointers to active response rings. That array can then be scanned using the giza_drain_array or giza_drain_test macros.

rnum is the ring number rrcpp is an array of ring pointers, to be filled in by giza_prep_scan( )

the function return is the number of rings found and entered in the array, rrcpp void giza_drain_reject_list(void)

Description

The giza_drain_reject_list( ) library routine retrieves MDBs that giza_submit rejects because they are not properly formatted. On the host side, this is called from various places—the scheduler, an interrupt routine, Qrun, etc. to check for pending returns.

void giza_drain_response_ring(sys_giza_response_ring_control *ringp);

Description

The giza_drain_response_ring( ) library routine empties the indicated response ring of MDBs, calling the callback entry for each of them. Typically it is called only from the giza_drain_array macro.

Comments

By design, Giza response rings are "locked"; that is, in a multiple CPU system, if one CPU starts removing MDBs from a locked ring, the CPU will remove all MDBs until the ring is empty. This guarantees the sequential removal of MDBs and the sequential processing of callbacks.

If the order of MDB processing is not important (e.g., if the callback does nothing but return the MDB to a heap), then the response ring can have the flag unlocked_callback==1. With this option, the lock on the ring is released during callback allowing unloading by multiple functional units simultaneously. This option is used for callbacks where message order is unimportant.

void _giza_submit(sys_mdb_header *mdbp);

Description

The giza_submit( )library routine submits MDBs to the command (to_giza) ring. When there are multiple functional units that could be making this call, the command (to_giza) ring is first locked. Then, if the submitting functional unit has address mapping, the physical address for each MDB is computed. The first MDB is placed on the to_giza ring, with subsequent MDBs added to that ring one at a time.

Comments

To submit a list of MDBs to giza_submit, MDBs are presented by hanging them off the given MDB's virtual next pointer (mdbp→virt_next_link). MDBs are processed in order, from list head (mdbp) to tail when virt_next_link is NULL. This list should be assumed to be temporary. The Giza engine may or may not write over the virtual next pointers used.

The host device and the peripheral device (IOA) both submit MDB's to GIZA by way of giza_submit.

Command Rings

There is one to_giza ring for each Giza engine. The to_giza ring holds MDB pointers that the functional unit hands to the Giza engine, which processes the MDBs in order as it receives them.

When the MDB's are received by GIZA, the controller wants to match MDB's with the same integer channel number together. The following discussion relates to the virtual channel element of FIG. 1B Giza Channel Numbers In the illustrated embodiment, a Giza channel number is a 32-bit integer. The high-order eight bits specify the Giza engine being used (i.e., the IOP backpanel slot). The remaining 24 bits are a Giza table index, allocated by a Connection Manager, which has write-access to the Giza match table. Presently, the Connection Manager runs on the controller board (e.g., IOP) that implements the Giza engine.

The lower numbered channels on each Giza engine are reserved for pre-assigned functions. In the illustrated embodiment, there are 8 channels (0 ... 7) reserved for the IOP and 8 channels for each IOA (8 ... 119, since there are 14 IOA's per IOP).

Pre-Defined IOA and IOP Channels

Table 1 summarizes the uses of these predefined channels, in the illustrated embodiment.

TABLE 1

Summary of Pre-Defined IOA and IOP Channels

| Channel Number | Direction on the IOA-Side | Direction on the IOP-Side | Purpose |
| --- | --- | --- | --- |
| 0 | to IOA | to IOP | System-level communication. |
| 1 | from IOA | from IOP | |
| 2 | to IOA | to IOP | Reserved for IOA and IOP |
| 3 | from IOA | from IOP | PROM-resident debuggers. |
| 4 | to IOA | to IOP | Giza Connection Manager. |
| 5 | from IOA | from IOP | |
| 6 | to IOA | to IOP | Driver-specific messages |
| 7 | from IOA | from IOP | (reserved, but not defined on the IOP side). |

Initialization of the IOP opens these pre-defined channels, and they remain open. All pre-defined channels carry single block messages, with the code servicing each channel defining the maximum block size of the message.

System-Level Channels (0 and 1)

A message protocol over the system-level channels (0 and 1) is yet to be defined. The goal is to have these channels in communication with the system, perhaps simply transmitting system error messages.

Debugger Channels (2 and 3)

Channels 2 and 3 are reserved for a standard set of debugger primitives for IOA and IOP PROM-resident debuggers. These debuggers are designed to do the following:

set and clear breakpoints read/write IOA memory read/write registers at break time single step through code continue from a breakpoint read/write mapping registers.

Connection Manager Channels (4 and 5).

Channels 4 and 5 are used for channel control operations:

opening channels closing channels flushing channels resuming channels disconnecting channels.

IOA Driver-Specific Channels (6 and 7)

In the illustrated embodiment, on the IOA side, channels 6 and 7 are driver-specific channels, which can be used for any of the following:

firmware configuration statistics gathering communicating new channel numbers channel cleanup priority messages.

IOP Channels 6 and 7

On the IOP side, channels 6 and 7 are the Maintenance and Diagnostic (M&D) channels.

Creating Additional IOA Channels

I/O drivers are not limited to using only these pre-defined channels; that is, an arbitrary number of additional unidirectional channels can be created to each IOA. The developer writing the driver code decides the functionality required of these additional channels. For example, a developer might write an IOA driver that requires a channel pair created for each physical line connected to the IOA. Another might select a single channel pair, and multiplex messages for the multiple lines. Yet another might create one channel pair for each VOS port or FTX Stream accessing the IOA.

The GIZA channels may exist in one of several different states. The following library routines and procedures relate to the virtual channel element of FIG. 1B and the state diagram of FIG. 9.

The Interface for Channel Manipulation

The following describes how to manipulate Giza channels. The first part of the section provides a general overview of channel manipulation, and the latter part discusses in detail the relevant library routines.

Giza channels are numbered, with the integer channel number applying only to a specific Giza engine; that is, since there may be more than one board of a particular Giza engine type in a system, each Giza engine has its own ring descriptor. The full channel ID is a 32-bit integer. The high-order eight bits specify the Giza engine being used (i.e., the IOP backpanel slot). The remaining 24 bits are a Giza table index, allocated by a Connection Manager, which has write-access to the Giza match table. Presently, the Connection Manager runs on the controller board(e.g., IOP) that implements the Giza engine.

Overview of Channel Manipulation

Figure 9:
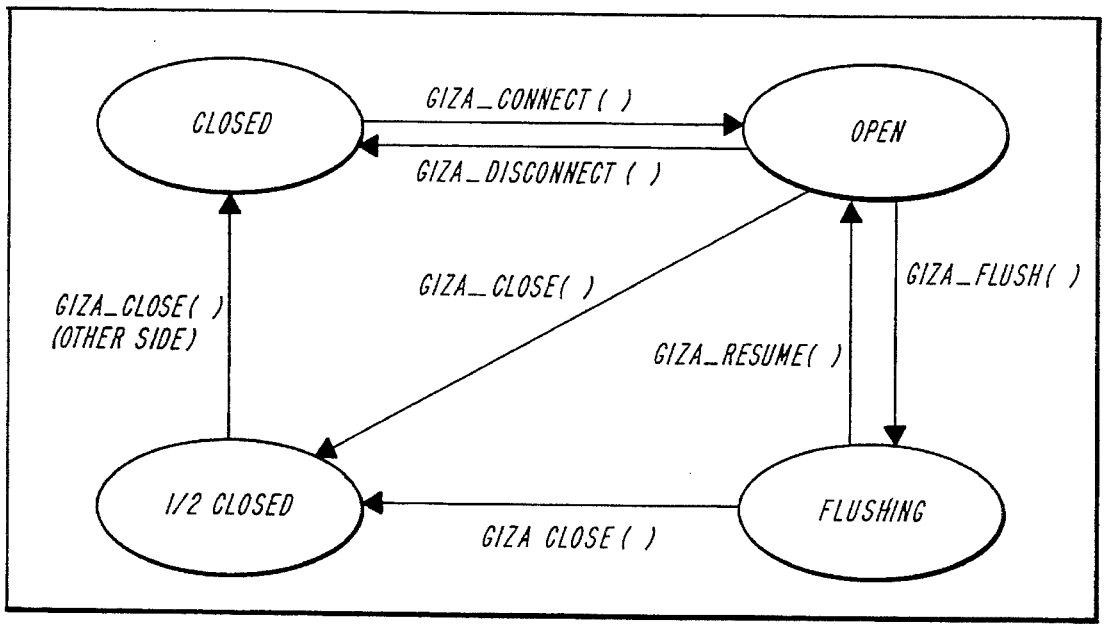
FIG. 9 shows states of a channel used in a of a preferred data transfer system according to the invention.

The subsections that follow provide an overview of channel manipulation (i.e.,creating, flushing, resuming, and closing a channel). FIG. 9 illustrates the states of a Giza channel from the caller's perspective (i.e., the sending side).

In the illustrated embodiment of the invention, the GIZA channels may exist in one of four states: closed, open, flushing, or half-closed.

Creating a Channel

Every functional unit that implements Giza transfers has the potential to create new Giza channels using the giza_connect( ) library routine.

The caller (typically a device driver in the system) specifies the following:

the direction of the channel desired the functional unit at the other end of the channel miscellaneous configuration information.

The library routine returns an integer channel number.

Flushing a Channel

The process of flushing a channel retrieves any MDBs that have been posted but not processed. A driver at either end of a Giza channel can force a flush of its side of the channel. This might occur as a result of a user's I/O abort request or in preparation to close the channel. To flush a channel, the giza_flush( ) library routine is used. This routine sends a request to the Connection Manager which marks the channel as flushing and returns any MDB's currently queued in the Giza engine for that channel. The returned MDBs are marked with the error bit (flushed).

To ensure that the channel is fully flushed, the requester can either maintain a count of all MDBs, or send a "tracer bullet MDB" down to the channel. The tracer returns when the channel is fully flushed, because MDB's are returned in the same order they were submitted, whether they were completed by normal data transfer, error or flushing.

Resuming Use of a Channel

A driver flushes a channel with the intention of either closing it or merely aborting some pending operation. If the channel is not to be closed, it must be made to resume operation before it can be used again. Otherwise, all subsequent MDB's will be returned marked "flushed". The giza resume( ) library function sends a message to the Connection Manager which then marks that side of that channel no longer flushing.

Closing a Channel

If a driver decides to close a channel, there are two methods:

the normal, orderly method in situations where there are severe error conditions.

This subsection describes the normal, orderly method, and the subsection below discusses disconnecting a channel that has encountered severe error conditions.

In the normal closing of a channel, the driver tells its partner functional unit to close the intended channel. Each functional unit then flushes that channel. Once the flush is accomplished, each side calls the giza_close( ) library routine to close the channel. This sends a message to the Connection Manager to close the caller's side of the channel in question. The channel is marked "closed" on that side only. Once a channel is marked "closed" on both sides, it is returned to the free pool of channels for re-use.

Disconnecting a Channel

In case the partner functional unit for some driver should die (as far as the driver is concerned), that driver can force the channel closed by using the giza disconnect( ) library routine. This routine generates a message to the Connection Manager requesting that both sides of the channel be closed immediately. The requesting functional unit should flush its side of the channel first, but that is not required.

Synopsis of Channel Manipulation Library Routines

Table 2 briefly describes the standard set library routines used to manipulate Giza channels.

TABLE 2

Summary of the Giza Library Routines for Channel Manipulation

| Library Routine | Description |
| --- | --- |
| giza_connect( ) | Creates a new Giza channel (new match table entry in the Giza engine). Internal to the library code, this routine allocates a CONNECT MDB and a RESPONSE MDB pair. It then submits the MDBs to the Giza Connection Manager in the IOP (via channels 4 and 5), waits for the Connection Manager's response, and returns any error status. |
| giza_flush( ) | Used as part of an I/O abort, or to prepare for closing a channel, it flushes a channel, forcing any pending MDBs on the caller's side to be returned to the caller. All MDBs return in the order they were submitted. If the channel cannot be flushed, a system error message is generated and logged. |
| giza_resume( ) | Resumes use of the channel after a temporary interrupt to do a flush. If the driver cannot resume use of the |

TABLE 2-continued

Summary of the Giza Library Routines for Channel Manipulation

| Library Routine | Description |
| --- | --- |
| | specified channel, a system error message is generated and logged. |
| giza_close( ) | The normal mechanism for closing a channel, both the transmitting and sending sides must issue this call in order for the channel to be available for re-use. With this call, the caller promises to submit no more MDBs to that channel. If the channel cannot be closed, a system error message is generated and logged. |
| giza_disconnect( ) | Used in emergency situations only (e.g., when an IOA has died), this call disconnects a channel. Either the host or the IOA side can request this library routine; however, when requested, it forces the channel to flush and close on both sides at the same time. If the channel cannot be disconnected, a system error message is generated and logged. |

Parameters for Basic Channel Manipulation Library Routines

All of the basic channel manipulation library routines receive a channel number identifier (channel_number), which the giza_connect provides from the following input:

c_device_id transfer_type number_of_blocks.

The c_device_id is a structure that consists of the IOP slot number and IOA slot number as shown below.

```
typedef struct
{
        char slot_level; /* IOP slot */
        char device_level; /* IOA slot */
        char pad[6];
}       c device_id;
```

The transfer_type parameter, which is permanent for the duration of the connection, describes the type of channel that is to be created. It can be one of the following types.

| #define SEND | 0 |
| #define RECEIVE | 1 |

The number of blocks parameter is recorded in the channel definition in the match table and is used in the illustrated embodiment to restrict the MDB's which are accepted for that channel (i.e., they must have exactly the number of blocks indicated when the channel was opened).

In addition to the channel_number parameter, when flushing, closing, or resuming on a channel, the setting of a write_bit parameter indicates whether the write-side (non-zero) or read-side (0) of the channel is affected. Neither the giza_connect nor the giza_disconnect library routines use the write_bit parameter.

NAL Library Routines

Each of the library routines for channel manipulation has an alternate routine that does no memory allocation. These alternate library routines are shown below.

giza_close_nal
giza_connect_nal
giza_disconnect_nal
giza_flush_nal
giza_resume_nal In an illustrated embodiment, these routines may be used for the following reasons:

if there might be a memory limitation (system having exhausted free storage)

if the caller is unable to suspend (has no process attached—e.g., is at interrupt level, in a Streams module, in a Giza callback, . . . )

Parameters: giza_connect_msg and other rpc_msg

In addition to the parameters that the basic channel manipulation library routines use, the NAL routines post two MDB's to the connection manager channels—one to send the particular request (i.e., to connect, close, flush, resume, or disconnect), one to receive a reply that the request was successfully completed (or to receive back an error if unsuccessful). The giza_connect_nal library routine uses giza_connect_msg, which is shown below.

```
/*GIZA Connection Manager message structures - - with
their MDBs* /
        typedef struct LONGMAP
            unsigned char    command;           /* the command to which this
                                                 is response */
            unsigned char    sequence_number;   /* the sequence number used
                                                 */
            unsigned short   status;            /* 0 = good status; else VOS
                                                 error code */
            long             chan_number;       /* the answer, if this is a
                                                 connect */
}conman_response;
typedef struct LONGMAP
        unsigned char    command;               /* connection manager
                                                 command =
                                                 CONNECT */
        unsigned char    sequence number;       /* echoed in the response;
                                                 not checked */
        unsigned char    padb;
        unsigned char    target_slot;           /* the slot at the other end
                                                 of channel */
        unsigned char    transfer_type;         /* kind of transfer (1 of 6)
                                                 */
        unsigned char    number_of_blocks;      /* # blocks in MDBs on the
                                                 new channel */
        unsigned char    padw;
}connect_request;
typedef struct LONGMAP
}
        unsigned char    command;               /* Connection Manager
                                                 command */
        unsigned char    sequence_number;       /* echoed in the response;
                                                 not checked */
        unsigned char    side;                  /* =0 means read; not used
                                                 in disconnect */
        unsigned char    pad;
        long             chan_number            /* GIZA channel number */
}other_request;
typedef struct $longmap
        sys_mdb_11 rsp_mdb;                     /*MDB for the response from a
                                                 connection*/
        conman_response cmd_resp ;              /*the response message*/
        sys_mdb_11 cmd_mdb ;                    /*MDB for the connection request*/
        connect_request con_request ;           /*the connection request message*/
        long pid ;                              /*the process ID of the suspended
                                                 caller*/
        unsigned long iop_slot ;                /*the slot # field to be merged
                                                 with*/
        /*cmd_resp's chan_number*/
        /*by the callback from giza_connect_nal*/
} giza_connect_msg ;
        /* the reply is first in the giza_connect_msg structure because
        the whole structure is returned to free storage when the reply
        comes back and at that time, we're given a pointer to rsp_mdb */
```

The remaining NAL routines for flushing, resuming, closing, or disconnecting a channel use other_rpc_msg, which is shown below.

/* The following messages have replies, but a different structure

-continued

```
from giza_connect_msg for the request */
typedef struct
{
    sys_mdb_11 rsp_mdb ;
    conman_response cmd_resp ;
```

```
    sys_mdb_11 cmd_mdb ;           /* MDB */
    other_request other_request ;  /* message */
    long pid ;                     /* the process ID of the
                                      suspended caller */
} other_rpc_msg ;                  /* disconnect, close, flush,
                                      resume */
```

Macros that Extract Error Codes for NAL Routines

Two macros are used to extract VOS error codes from the connection manager message pair sent with giza_connect_msg or other_rpc_msg. Those macros are CONMAN_ERR and NEW_CHAN, which are shown below.

```
/* CONMAN_ERR works for both giza_connect_msg and pther_rpc_msg
because they start the same and this macro references only fields
in the first three substructures. CONMAN_ERR extracts a VOS error
code from the returned connection manager message pair. */
#define CONMAN_ERR(mdbp) ( \
                         ((((mdbp)->cmd_mdb.hdr.message_status) != 0)\
                       || (((mdbp)->rsp_mdb.hdr.message_status) != 0))?\
                          (eSgiza_connect_failed) : \
                          ((mdbp)->cmd_resp.status))
/*NEW_CHAN builds a channel_number from the reply to be found in
the returned MDB. If there was an error, an illegal channel
number is created.*/
#define NEW_CHAN(mdbp) ((channel_number) \
                         ((((mdbp)->cmd_mdb.hdr.message_status) != 0) \
                       || (((mdbp)->rsp_mdb.hdr.message_status) != 0) \
                       || (((mdbp)->con_request.command) !=
                           (mdbp)->cmd_resp.command)) \
                       || (((mdbp)->con_request.sequence_number) \
!= ((mdbp)->cmd_resp.sequence_number)) \
                       || (((mdbp)->cmd_resp.status) != 0)) ?
                          (0x7fffffff) : \
                          ((mdbp)->iop_slot \
                        |  (mdbp)->cmd_resp.chan_number))
```

The channels of the virtual channel element are capable of existing in various states as shown in FIG. 9. The following relates to the manner by which these various states may be effected in the nal form.

giza_close_nal ( )
Calling Sequence

| short giza_close_nal( | channel_number *sc, short *write_bit, other_rpc_msg *mdbp, void (*callback) (sys_mdb_header *) ); |
|---|---|

Description

The giza_close_nal( ) call closes a channel similarly to the giza_close( )library routine. The caller promises to submit no more MDBs to the specified channel. Only when both sides declare the indicated channel closed does it really get returned to the free pool of channels.

Input Parameters

| channel_number | Identifies the Giza channel that will be closed. |
| write_bit | Set to 0 if closing a read-side channel (i.e., channel receiving MDBs); it is set to non-zero if closing a write-side channel (i.e., channel sending MDBs). |
| other_rpc_msg | Contains two MDBs - one that sends |

| | the message to close the channel via the connection manager, and one that receives the message back with either affirmation that the close was successful, or an error message. |
|---|---|
| callback | address of the C function to be called when the connection manager has completed this request. | giza_connect_nal( )
Calling Sequence

```
short giza_connect_nal( c_device_id *d_idp, short
*transfer_type, short *number_of_blocks, giza_connect_msg
*mdpb, void (*callback) (sys_mdb_header *) );
```

Description

The giza_connect_nal( ) library routine requests the Connection Manager to allocate and initialize a new channel (new match table entry in the Giza engine) as indicated by d_idp, Users of this routine should use the NEW_CHAN-(mdpb) macro to get the result back from the giza_connect_msg on callback.

Input Parameters

| c_device_id | A structure that consists of the IOP slot number and IOA slot number, as shown below. |
|---|---|
| typedef struct { char slot_level; char device_level; char pad[6]; } c device_id; | /* IOP slot */ /* IOA slot */ |
| transfer_type | Permanent for the duration of the connection, it describes the type of channel that is to be created. It can be one of the following types. |

|  |  |
|---|---|
| # define SEND | 0 |
| # define RECEIVE | 1 |
| number_of_blocks | Defines and restricts the channel. |
| giza_connect_msg | Contains two MDBs - one that sends the message to connect the channel via the connection manager, and one that receives the message back with either affirmation that the connection was successful, or an error message. |
| callback | address of the C function to be called when the connection manager has completed this request. |
| giza_disconnect_nal( ) Calling Sequence | | short giza_disconnect_nal(channel_number *sc, other_rpc_msg *mdbp, void(*callback) (sys_mdb_header*));

Description

The giza_disconnect_nal( ) library routine is for emergency use only (e.g., when an IOA has died). It can be issued from either the host or the IOA side, but, when issued, forces the channel, identified by the channel_number parameter, to flush and close on both sides at the same time.

Input Parameters

|  |  |
|---|---|
| channel_number | Identifies the Giza channel that will be disconnected. |
| other_rpc_msg | Contains two MDBs - one that sends the message to disconnect the channel via the connection manager, and one that receives the message back with either affirmation that the disconnect was successful, or an error message. |
| callback | address of the C function to be called when the connection manager has completed this request. |
| giza_flush_nal( ) Calling Sequence | |
| short giza_flush_nal | (channel_number *sc, short *write_bit, other_rpc_msg *mdbp, void (*callback) (sys_mdb_header *)); |

Description

The giza_flush_nal( ) library routine is an alternate mechanism to the giza_flush( ) library code. Used as part of an I/O abort, or to prepare for closing a channel, it flushes a channel, forcing any pending MDBs on the caller's side to be returned to the caller. All MDBs return in the order they were submitted. If the channel cannot be flushed, a syserr message is generated and logged.

Input Parameters

|  |  |
|---|---|
| channel_number | Identifies the Giza channel that will be flushed. |
| write_bit | Set to 0 if closing a read-side channel (i.e., channel receiving MDBs); it is set to non-zero if closing a write-side channel (i.e., channel sending MDBs). |
| other_rpc_msg | Contains two MDBs - one that sends the message to flush the channel via the connection manager, and one that receives the message back with either affirmation that the flush was successful, or an error message. |
| callback | address of the C function to be called when the connection manager has completed this request. |
| giza_resume_nal( ) Format | |
| short giza_resume_nal( | channel_number *sc, short *write_bit, other_rpc_msg *mdbp, void (*callback) (sys_mdb_header *) ); |

Description

The giza_resume_nal( ) library routine is an alternate mechanism to giza_resume( ), which returns a channel to operation.

A channel is generally flushed before closing (or disconnecting) it. However, use of a channel also can be temporarily interrupted to flush and retrieve posted MDBs as part of, for example, an I/O abort. Once the posted MDBs have been retrieved, the driver can resume using the still-open channel by calling the giza_resume( ) library routine.

Input Parameters

|  |  |
|---|---|
| channel_number | Identifies the Giza channel that will resume MDB traffic. |
| write_bit | Set to 0 if resuming on a read-side channel (i.e., channel receiving MDBs); it is set to non-zero if resuming on a write-side channel (i.e., channel sending MDBs). |
| other_rpc_msg | Contains two MDBs - one that sends the message to resume on a particular channel via the connection manager, and one that receives the message back with either affirmation that the resume was successful, or an error message. |
| callback | address of the C function to be called when the connection manager has completed this request. |
| giza_close( ) Calling Sequence | | short giza_close ( channel_number *sc, short *write_bit );

Description

The giza_close( ) call is the normal mechanism for closing a channel. With this call, the caller promises not to send any more MDBs to the specified channel. Only when both sides declare the indicated channel closed does it really get returned to the free pool of channels.

Input Parameters

|  |  |
|---|---|
| channel_number | Identifies the Giza channel that will be closed. |
| write_bit | Set to 0 if closing a read-side channel (i.e., channel receiving MDBs); it is set to non-zero if closing a write-side channel (i.e., channel sending MDBs). |
| giza_connect( ) | |

-continued

Calling Sequence short giza_connect (     c_device_id *d_idp, short
*transfer_type,short *number_of_blocks,
channel_number *sc);

Description

The giza_connect( ) library routine allocates and initializes a new channel (new match table entry in the Giza engine).

Input Parameters

| | |
|---|---|
| device_id | A structure that consists of the IOP slot number, IOA slot number, and the IOA port as shown below. |
| typedef struct | |
| { | |
|    char slot_level; | /* IOP slot */ |
|    char device_level; | /* IOA slot */ |
|    char pad[6]; | |
| } device_id; | |
| transfer_type | Permanent for the duration of the connection, it describes the type of channel that is to be created. It can be one of the following types. |
|    #define SEND | 0 |
|    #define RECEIVE | 1 |
| number_of_blocks | Defines and restricts the channel. |
| Output Parameter | |
| channel_number | Identifies the Giza channel created in response to this request | giza_disconnect( )
Calling Sequence short giza_disconnect( channel_number *sc);

Description

The giza_disconnect( ) library routine is for emergency use only (e.g., when an IOA has died). It can be issued from either the host or the IOA side, but, when issued, forces the channel, identified by the channel_number parameter, to flush and close on both sides at the same time.

Input Parameters

| | |
|---|---|
| channel_number | Identifies the Giza channel that will be disconnected. | giza_flush( )
Calling Sequence short giza_flush( channel_number *sc, short *write_bit );

Description

The giza_flush( ) library routine is used as part of an I/O abort, or to prepare for closing a channel. It flushes a channel, forcing any pending MDBs on the caller's side to be returned to the caller. All MDBs return in the order they were submitted. If the channel cannot be flushed, a system error message is generated and logged.

Input Parameters

| | |
|---|---|
| channel_number | Identifies the Giza channel that will be flushed. |
| write_bit | Set to 0 if flushing a read-side channel (i.e., channel receiving MDBs); it is set to non-zero if flushing a write-side channel (i.e., channel sending MDBs). | giza_resume( )
Calling Sequence short giza_resume( channel_number *sc, short *write_bit );

Description

A channel is generally flushed before closing (or disconnecting) it. However, use of a channel also can be temporarily interrupted to flush and retrieve posted MDBs as part of, for example, an I/O abort. Once the posted MDBs have been retrieved, the driver can resume using the still opened channel by calling the giza_resume( ) library routine.

Input Parameters

| | |
|---|---|
| channel_number | Identifies the Giza channel that will resume MDB traffic. |
| write_bit | Set to 0 if resuming on a read-side channel (i.e., channel receiving MDBs); it is set to non-zero if resuming on a write-side channel (i.e., channel sending MDBs). |

Response Rings

GIZA returns the MDB's to their corresponding device. The MDB's are returned by way of a software ring (response ring). Hence, the following relates to the return FIFO elements as depicted in FIG. 1B.

A response (from_giza) ring is a temporary holding FIFO for MDB pointers returning from the Giza engine to the kernel or IOA firmware. Every host and IOA has at least one from_giza ring associated with it. However, to provide for flexibility in designing code, most functional units have more than one response ring from which to choose. This accommodates different classes of MDBs. For example, an application might require MDBs with a minimum latency and choose to handle them at interrupt level (e.g., ACK of Ethernet packets). Alternatively, an application might care to minimize CPU usage rather than latency and therefore want to process MDB callbacks in the background (e.g., from a polling loop).

On a multiprocessor functional unit, it is necessary to lock a ring to one processor while doing callbacks if one wants to guarantee that callbacks are completed in the same order in which they occurred on the ring. This locking restricts callback processing to one CPU at a time. It is therefore an option to have an unlocked ring, allowing multiple CPUs to process callbacks simultaneously. These are to be used only for MDB's for which order is unimportant. By default, order is assumed important and therefore locked rings are assumed to be the normal case.

For this purpose, the discussion below looks at two categories of attributes associated with Giza rings—one attribute determines if an interrupt is generated when an MDB is placed on an empty response ring, and the other determines whether the response ring is locked.

Table 3 shows a set of rings chosen to illustrate these options. There are more rings defined here than will be used in any one system, as currently planned.

TABLE 3

Examples of Current Giza Rings

| Identifier | Name | Description |
|---|---|---|
| 0 | M_AND_D_RING | Response ring specifically used by the M & D process. |
| 1 | CPU_DEBUG_RING | Response ring specifically used by the CPU debugger (called PCP). |
| 2 | INTERRUPT_RING | General purpose locked interrupt response ring. |
| 3 | UNLOCKED_INTERRUPT_RING | Interrupt response ring with an unlocked callback. |
| 4 | QRUN_RING | Qrun( ) locked non-interrupt response ring. |
| 5 | SCHEDULER_RING | Scheduler-type non-interrupt locked response ring. |
| 6 | UNLOCKED_SCHED_RING | Scheduler-type non-interrupt unlocked response ring. |

Interrupt and Non-Interrupt Rings

Generally, Giza response rings are one of the following types:

An interrupt ring, which is flagged to cause an interrupt on the functional unit when an MDB is placed on it (assuming it was previously empty).

A polled ring, which the functional unit polls frequently (e.g., in a main loop, in scheduler code, on kernel exit, etc.).

A custom polled ring, which is not normally polled, but might be in special circumstances. Custom polled rings might be used only for test programs, or by the CPU PROM while in a debugger with the system halted.

Locked and Unlocked Rings

The other attribute of Giza rings determines if they are locked. A locked ring will not allow multiple CPUs to service it at the same time. This is the default, and is required when message order is important and multiple CPUs might try to service the same ring at the same time. Unlocked rings are preferably used only when the order of MDBs is unimportant—for example, when the callback for some MDB does nothing but return it to a free storage.

Error Conditions

Giza delivers blocks between functional units. Giza errors relate to block delivery, not to I/O errors. I/O errors are reported via normal Giza messages from the device adapter back to the driver.

Giza errors include the following:

checksum error death of a destination functional unit block overrun non-existent memory address non-existent Giza channel attempt to cross a page boundary.

When a transfer error occurs on a normal Giza channel, the message is not delivered, and the driver-writer needs to decide how to handle any pending MDBs. Both parties to the transfer are informed equally of the error.

Death of the GIZA Engine or a Functional Unit

If a functional unit using GIZA dies, the driver code on the partner functional unit must clean up by disconnecting any channels being used. Detection of death occurs via a GIZA error if a transfer was attempted and the GIZA engine discovers the functional unit no longer exists. Alternatively, it is recommended that communicating functional units send periodic "I'm alive, are you?" control messages to each other so that death is detected by the lack of such messages in a reasonable length of time (seconds to minutes).

If an GIZA engine dies, the channels are closed automatically, since they belong to the GIZA engine. The M&D process that detects the death of the GIZA engine calls the library routine, remove_giza_ring_db, which returns all MDBs that are owned by the GIZA engine after removing the GIZA engine's Giza rings. No MDBs can be submitted while these are being returned.

Administrative Library Routines

The process of creating and destroying software rings is essential to the function of GIZA. As a result, there must be code to initialize and create the rings. Hence, the following relate to the creation and destruction of software rings.

This section describes the following library routines, which are used to initialize and remove Giza rings:

init_giza_ring_db remove_giza_ring_db remove_giza_ring_db(short *iop_slot, short *simplexed)

The init giza ring db library routine allocates and initializes a set of rings for the GIZA engine in slot iop_slot. It returns a pointer to the ring descriptor data structure. The "simplexed" parameter should be non-0 if the GIZA engine being initialized is intentionally simplexed (as opposed to being a duplexed pair (this having been designed for Stratus hardware) or one half of a duplexed pair running alone).

sys_giza_db *init_giza_ring_db(short *iop_slot, short *simplexed)

Description

The host side uses the init_giza_ring_db library routine to initialize the Giza rings for an IOP in the iop_slot. It returns a pointer to the ring descriptor. The simplexed parameter should return non-0 if the IOP being initialized is simplexed (as opposed to running alone when it is intended to be part of a duplexed pair).

A more complete understanding of the illustrated embodiment may obtained by reference to the appendix hereto, listing inter alia data structures and processing steps of a preferred software embodiment of the invention.

Summary

Described above is a novel system (both method and apparatus) for transferring information between digital data processing functional units. The system includes, broadly, a digital data processing apparatus having two functional units (e.g., a host processing section and a peripheral device) and a controller for transferring information therebetween. The first functional unit generates a send message descriptor block ("MDB") signal specifying one or more addresses in an associated local memory from which data is to be transferred. The second functional unit generates a receive MDB signal specifying one or more locations in its associated local memory to which data is to be transferred. The controller matches send and receive MDB signals, particularly, those specifying the same logical or virtual channel.

The illustrated system provides improved transfer of information between digital data processing functional units. It can be used, for example, to provide improved input/output control that facilitate the rapid transfer of data to functional units, such as peripheral devices, while minimizing the complexity of attendant software and hardware mechanisms. Among its other features, the system provides enhanced immunity from timing errors.

Those skilled in the art will appreciate that the illustrated embodiment is exemplary, and that other systems constructed in accord with the teachings herein fall within the scope of the invention, of which we claim:

1. In a digital data processing apparatus of the type having at least first and second functional units, each of which includes associated memory means for storing data at addressable locations therein, each said memory means being responsive in a read mode to an applied address signal for generating a data signal representative of data stored at a location specified by such address signal, and being responsive in a write mode to applied address and data signals for storing at locations specified by such address signals data specified by such data signal, said data processing apparatus further including controller means coupled to said first and second functional units for transferring data therebetween, the improvement wherein A. said first functional unit includes sender means for generating and transferring to said controller a send MDB signal specifying one or more addresses from which data is to be transferred from the memory means associated with said first functional unit, said second functional unit includes receiver means for generating and transferring to said controller a receive MDB signal specifying one or more addresses to which data is to be transferred in the memory means associated with said second functional unit, B. said controller means includes MDB matching means, coupled to said sender and receiver means, for matching at least a selected one of said send MDB signals to a selected one of said receive MDB signals to generate a signal for effecting the transfer of data between respective locations of the memory means associated with said first and second functional units specified by the matching MDB signals, and C. said controller means further including data transfer means, coupled to said MDB matching means and to the memory means associated with said first and second functional units, for responding to said transfer-effecting signal for
   i) applying to the memory means associated with the first functional unit an address signal representative of addresses specified in the send MDB signal, and receiving therefrom data signals generated thereby in response to application of that address signal,
   ii) applying those data signals to the memory means associated with said second functional unit, along with an address signal representative of addresses specified in said receive MDB signal.

2. In a digital data processing apparatus according to claim 1, the further improvement wherein at least one of said first and second functional units comprises command FIFO means for storing one or more MDB signals pending receipt of a match.

3. In a digital data processing apparatus according to claim 2, the further improvement wherein each said command FIFO means comprises means for storing said respective MDB signals in such a way that they can be accessed in an order in which they were received by that command FIFO means.

4. In a digital data processing apparatus according to claim 1, the improvement wherein said MDB matching means comprises virtual channel means for matching MDB signals generated by said first and second functional units along a plurality of virtual channels.

5. In a digital data processing apparatus according to claim 4, the improvement wherein
   A. each of said sender means and receiver means includes means for generating said respective send MDB signal and receive MDB signal to include a virtual channel number specifying a virtual channel upon which said matching is to occur,
   B. said virtual channel means includes means for responding to send and receive MDB signals having like virtual channel numbers for effecting the transfer of the corresponding data.

6. In a digital data processing apparatus according to claim 5, the improvement wherein said virtual channel means comprises virtual channel memory means for storing at least one of
   A. At least a pointer to a send MDB signal pending receipt of a receive MDB signal having a like virtual channel number, and
   B. At least a pointer to a receive MDB signal pending receipt of a send MDB signal having a like virtual channel number.

7. In a digital data processing apparatus according to claim 4, the improvement wherein
   A. at least one of said first and second functional units comprise means for generating and transmitting to said controller a signal for requesting at least one of creation, flushing, closing, disconnecting and resuming a virtual channel,
   B. said virtual channel means comprises connection manager means responsive to such signal for selectively creating, flushing, closing, resuming and disconnecting a selected virtual channel.

8. In a digital data processing apparatus according to claim 7, the improvement wherein
   A. each of said sender and receiver means to include means for generating at least one of a channel flushing or channel closing signal, and
   B. said connection manager includes channel flushing means responsive to said channel flushing signal for performing at least one of the following operations
      (i) clearing a specified virtual channel of any pending MDB signals, and
      (ii) returning any pending or en-route MDB signals to the originating one of said respective first and second functional units,
   C. said connection manager further includes channel closing means responsive to said channel closing signal for isolating a specified virtual channel from further delivery of any of said send and receive MDB signals.

9. In a digital data processing apparatus according to claim 4, the improvement wherein said MDB matching means comprises a predefined virtual channel for transferring at least signals between said controller and at least one of said first and second functional units.

10. In a digital data processing apparatus according to claim 9, the further improvement wherein said MDB matching means comprises a predefined CONNECTION MAN- AGER VIRTUAL CHANNEL pair for transferring in two directions between said connection manager means and at least one of said first and second functional units signals representative of requests for connection manager operation and replies thereto.

11. In a digital data processing apparatus according to any of claim 9, the further improvement wherein said MDB matching means comprises a predefined DRIVER CONTROL virtual channel for transferring between any two of said controller, said first functional unit and said second functional unit, at least one of the following
 (i) a signal designating a virtual channel upon which a communication transaction is to be effected, and
 (ii) control and communication data.

12. In a digital data processing apparatus according to claim 9, the improvement wherein said MDB matching means further comprises at least one of
 A. a MAINTENANCE & DIAGNOSTIC predefined virtual channel for transferring at least one of diagnostic and error signals between at least two of said controller, said first functional unit, and said second functional unit,
 B. a DEBUGGER predefined virtual channel for transferring debugging signals between at least two of said controller, said first functional unit, and said second functional unit.

13. In a digital data processing apparatus according to claim 1, the improvement wherein the controller comprises return means responsive to completion of a data transfer for returning control of the corresponding send and receive MDB signals to respective ones of said first and second functional units.

14. In a digital data processing apparatus according to claim 13, the improvement wherein at least one of said first and second functional units further comprises at least one return FIFO means for holding a corresponding MDB signal upon completion of said data transfer.

15. In a digital data processing apparatus according to claim 14, the improvement wherein each of said sender means and receiver means includes means for generating said respective send and receive MDB signal to include a return FIFO number specifying which one of said respective return FIFO means the respective MDB signal is to be returned to.

16. In a digital data processing apparatus according to claim 13, the improvement wherein
 A. at least one of said sender and receiver means includes means for generating respective ones of said send and receive MDB signals to include a signal specifying a predetermined operation to be executed upon completion of said data transfer, and
 B. said corresponding first and second functional units include callback means for executing said predetermined operation upon return of control of a respective specifying one of said MDB signals.

17. In a digital data processing apparatus according to claim 16, the improvement wherein at least one of said sender and receiver means includes means for generating said signal specifying said predetermined operation to be an address indicative of programming instructions for carrying out that predetermined operation.

18. In a digital data processing apparatus according to claim 1, the improvement wherein
 A. said sender means includes means for generating a send MDB structure including at least one or more addresses in the associated memory means from which data is to be transferred, and zero, one or more other data,
 B. said receiver means includes means for generating a receiver MDB structure including at least one or more addresses in the associated memory means to which data is to be transferred, and zero, one or more other data,
 C. each of said sender and receiver means include means for generating an MDB signal to be a pointer to a respective one of said send and receive MDB structures.

19. In a digital data processing apparatus according to claim 13, the improvement wherein said return means includes means for marking said send and receive MDB signal to include a signal indicative of a status of the requested data transfer.

20. In a digital data processing apparatus according to claim 13, the further improvement wherein said return FIFO means further comprises INTERRUPT buffer means for storing signals representing MDB signals and for generating an interrupt upon receipt thereof.

21. An improved method of operating a digital data processing apparatus of the type having
 at least first and second functional units,
 each of which includes associated memory means for storing data at addressable locations therein,
 each said memory means being responsive in a read mode to an applied address signal for generating a data signal representative of data stored at a location specified by such address signal, and being responsive in a write mode to applied address and data signals for storing at locations specified by such address signals data specified by such data signal,
said data processing apparatus further including
 controller means coupled to said first and second functional units for transferring data there between,
the improvement comprising the steps of
 A. generating within said first functional unit a send MDB signal specifying one or more addresses in the associated memory means from which data is to be transferred, and transferring that send MDB signal to said controller,
 generating within said second functional unit a receive MDB signal specifying one or more addresses in associated memory means to which data is to be transferred, and transferring that receive MDB signal to said controller,
 B. matching within said controller at least a selected send MDB signal to a selected receive MDB signal to generate a signal for effecting the transfer of data between respective locations of the memory means of said first and second functional units specified by the matching MDB signals, and
 C. responding within said controller to said transfer-effecting signal for
 i) applying to the memory means of the first functional unit an address signal representative of addresses specified in the send MDB signal, and receiving therefrom data signals generated thereby in response to application of that address signal,
 ii) applying those data signals to the memory means of said second functional unit, along with an address signal representative of addresses specified in said receive MDB signal.

22. A method according to claim 21, the improvement comprising matching said MDB signals generated by said first and second functional units along a plurality of virtual channels.

23. A method according to claim 22, the improvement comprising the steps of
   A. generating said send MDB signal and said receive MDB signal to include a virtual channel number specifying a virtual channel over which said matching is to occur,
   B. responding within said controller to receipt of send and receive MDB signals having like virtual channel numbers for generating said transfer-effecting signal.

24. A method according to claim 21, comprising the steps of
   A. generating within any of said functional units a signal requesting at least one of creation, flushing, closing, disconnecting and resuming a virtual channel,
   B. responding to such request signal selectively creating, flushing, closing, resuming and disconnecting the selected virtual channel.

* * * * *